(12) United States Patent
Do

(10) Patent No.: US 9,523,221 B2
(45) Date of Patent: Dec. 20, 2016

(54) PIN LATCH WITH DETECTION DEVICE AND MOVABLE CATCH-PIN AND INTERMEDIATE POSITION WITH AUTOMATIC RETURN MECHANISM

(71) Applicant: ALCOA INC., Pittsburgh, PA (US)

(72) Inventor: Thai Do, Laguna Nigel, CA (US)

(73) Assignee: Alcoa Inc., Pittsburgh, PA (US)

( * ) Notice: Subject to any disclaimer, the term of this patent is extended or adjusted under 35 U.S.C. 154(b) by 185 days.

(21) Appl. No.: 14/461,544

(22) Filed: Aug. 18, 2014

(65) Prior Publication Data

US 2015/0021930 A1    Jan. 22, 2015

Related U.S. Application Data

(63) Continuation of application No. 13/681,716, filed on Nov. 20, 2012, now Pat. No. 8,807,604.

(Continued)

(51) Int. Cl.
*E05C 1/06* (2006.01)
*E05C 1/02* (2006.01)
(Continued)

(52) U.S. Cl.
CPC ........... *E05C 1/065* (2013.01); *E05B 15/0086* (2013.01); *E05B 41/00* (2013.01); *E05B 65/0817* (2013.01);
(Continued)

(58) Field of Classification Search
CPC .... E05C 19/14; E05C 19/145; E05B 15/0086; E05B 65/0817; Y10S 292/49; Y10T 292/216; Y10T 292/102; Y10T 292/2003; Y10T 292/1003
(Continued)

(56) References Cited

U.S. PATENT DOCUMENTS

| 1,487,641 | A | * | 3/1924 | Winning | ................. E05C 19/14 |
| | | | | | 292/DIG. 14 |
| 2,721,750 | A | * | 10/1955 | Rudis | ...................... E05C 1/065 |
| | | | | | 16/332 |

(Continued)

FOREIGN PATENT DOCUMENTS

| DE | 202220 C | | 2/1908 |
| DE | 732795 C | * | 3/1943 | ........... E05C 19/145 |

(Continued)

OTHER PUBLICATIONS

Aerospace Latching Systems, Alcoa Fastening Systems, http://www.alcoa.com/fastening_systens/aerospace/en/product.asp?cat_id+213[]_id=500, pp. I1-I2, 159-160, and i-iii (8 pages).

(Continued)

*Primary Examiner* — Kristina Fulton
*Assistant Examiner* — Christine M Mills
(74) *Attorney, Agent, or Firm* — Greenberg Traurig, LLC

(57) ABSTRACT

A pin latch includes a guide block, a handle having a trigger, and a shear pin housed slidably within the guide block and connected to the handle. The shear pin includes a catch-pin engageable by the trigger, and is slidable between an engageable position and a disengageable position when the handle is moved from a closed position to an open position. Alternately, the pin latch includes a bracket connected to the shear pin and includes a catch-pin, and the handle is moveable to an intermediate position, such that a trigger is disengaged from the catch-pin and the shear pin engages a stop pin. A guide block spring acts on the stop pin to retain releasably the handle in its intermediate position. The guide block includes a finger and the shear pin includes a groove sized and shaped to receive the finger when the pin latch is in an unlatchable position.

10 Claims, 35 Drawing Sheets

Related U.S. Application Data

(60) Provisional application No. 61/566,254, filed on Dec. 2, 2011.

(51) Int. Cl.
| | | |
|---|---|---|
| *E05B 15/00* | (2006.01) | |
| *E05C 19/14* | (2006.01) | |
| *E05B 65/08* | (2006.01) | |
| *E05B 41/00* | (2006.01) | |
| *E05B 13/00* | (2006.01) | |
| *B64D 29/06* | (2006.01) | |

(52) U.S. Cl.
CPC ............. *E05C 19/14* (2013.01); *E05C 19/145* (2013.01); *B64D 29/06* (2013.01); *E05B 13/002* (2013.01); *Y10S 292/49* (2013.01); *Y10T 292/102* (2015.04); *Y10T 292/1003* (2015.04); *Y10T 292/216* (2015.04)

(58) Field of Classification Search
USPC ................. 292/256.69, 143, 181, DIG. 49
See application file for complete search history.

(56) References Cited

U.S. PATENT DOCUMENTS

| | | | | |
|---|---|---|---|---|
| 2,944,848 | A | * | 7/1960 | Mandolf ................. E05B 5/00 292/181 |
| 3,341,239 | A | * | 9/1967 | Wheeler ................ E05C 1/065 292/139 |
| 4,053,177 | A | | 10/1977 | Stammreich et al. |
| 4,099,751 | A | * | 7/1978 | Poe ........................ E05C 1/065 292/139 |
| 4,130,307 | A | * | 12/1978 | Poe ........................ E05C 1/065 292/179 |
| RE31,935 | E | | 7/1985 | Poe |
| 4,826,221 | A | * | 5/1989 | Harmon ................ E05B 63/128 292/106 |
| 4,828,299 | A | * | 5/1989 | Poe ...................... E05B 63/128 292/139 |
| 4,911,485 | A | * | 3/1990 | Wasilewski ........... E05C 1/065 292/139 |
| 5,984,382 | A | * | 11/1999 | Bourne ................. B64D 29/06 292/113 |
| 6,123,370 | A | | 9/2000 | Rozema et al. |
| 6,913,297 | B2 | | 7/2005 | Jackson et al. |
| 8,371,626 | B2 | * | 2/2013 | Huston ................. B64C 1/1407 292/139 |
| 2005/0087996 | A1 | | 4/2005 | Jackson et al. |
| 2011/0109103 | A1 | | 5/2011 | Huston et al. |

FOREIGN PATENT DOCUMENTS

| | | | | |
|---|---|---|---|---|
| DE | 2523581 A1 | * | 12/1976 | ........... B62D 33/037 |
| DE | 2613319 A1 | * | 10/1977 | ........... B62D 33/037 |
| DE | 3045865 A1 | * | 7/1982 | ......... B62D 33/0207 |
| DE | EP 0075038 A1 | * | 3/1983 | ........... E05C 19/145 |
| DE | 4436044 A1 | * | 4/1995 | ........... B62D 33/037 |
| DE | 29807738 U1 | | 7/1998 | |
| EP | 2031157 A1 | | 3/2009 | |
| FR | 2261396 A1 | * | 9/1975 | ............. E05C 19/14 |
| FR | 2397503 A1 | * | 2/1979 | ........... E05B 85/107 |
| FR | 2560270 A1 | * | 8/1985 | ............. E05C 1/065 |
| FR | 2646683 A1 | * | 11/1990 | ............. E05C 1/065 |
| FR | 2852049 A1 | | 9/2004 | |
| FR | EP 2431555 A1 | * | 3/2012 | ............. E05B 5/003 |
| GB | 191493 A | | 1/1923 | |
| GB | 1497982 A | * | 1/1978 | ........... B62D 33/037 |
| GB | 1537410 A | * | 12/1978 | ............. E05C 1/065 |
| GB | 1575252 A | * | 9/1980 | ............. E05C 1/065 |
| WO | 2010/033026 A1 | | 3/2010 | |
| WO | 2010/149905 A1 | | 12/2010 | |

OTHER PUBLICATIONS

Fairchild Fasteners, Aerospace Mechanisms, "RAM (Trademark) Aerospace Latch Mechanism", 2000 (4 pages).
Rotary Latch #TL18261, Alcoa Fastening Systems, Mar. 2005 (1 page).
Commonly owned U.S. Appl. No. 13/043,717 "Latch With Adjustable Handle", filed Mar. 9, 2011 (18 pages).
Commonly owned U.S. Appl. No. 13/023,081 "Side-Driven Action Pin Latch", filed Feb. 8, 2011 (25 pages).
Commonly owned U.S. Appl. No. 13/416,080 "Pin Latch Having an Intermediate Position", filed Mar. 9, 2011 (53 pages).
Commonly owned U.S. Appl. No. 13/285,323 "Rotary-Handle Latch", filed Oct. 31, 2011 (31 pages).
International Search Report and Written Opinion in connection with International Patent Application No. PCT/US2012/059206 "Rotary-Handle Latch" dated Jan. 18, 2013 (9 pages).
International Search Report and Written Opinion in connection with International Patent Application No. PCT/US2012/066039 "Pin Latch With Detection Device and Movable Catch-Pin and Intermediate Position With Automatic Return Mechanism" dated Feb. 25, 2013 (15 pages).

* cited by examiner

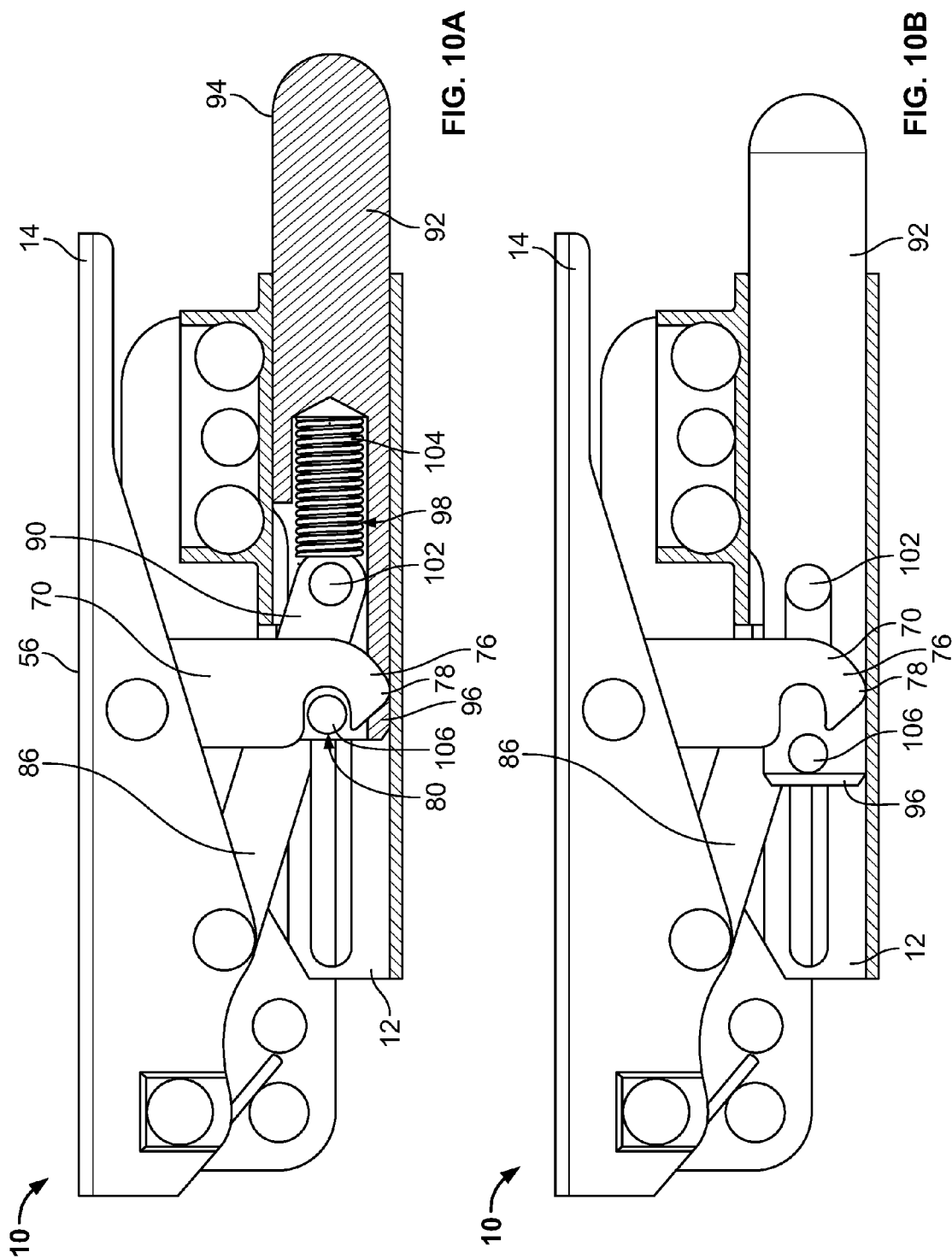

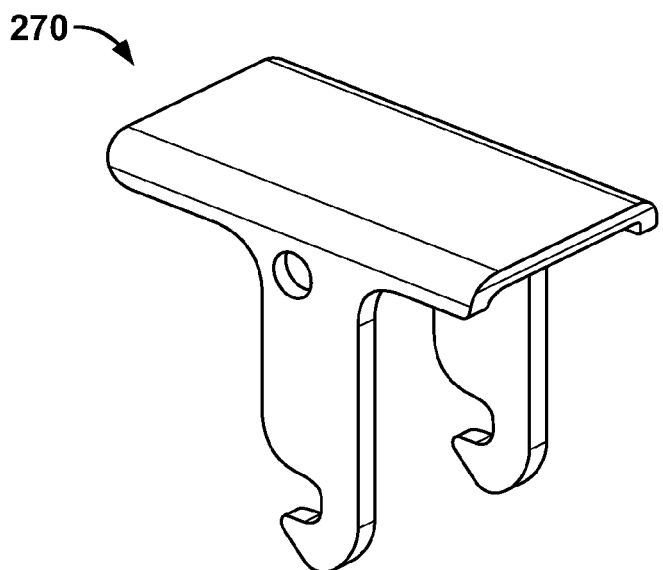
FIG. 17A
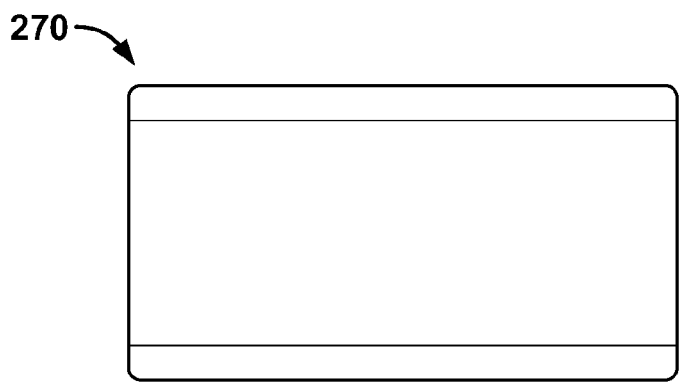
FIG. 17B
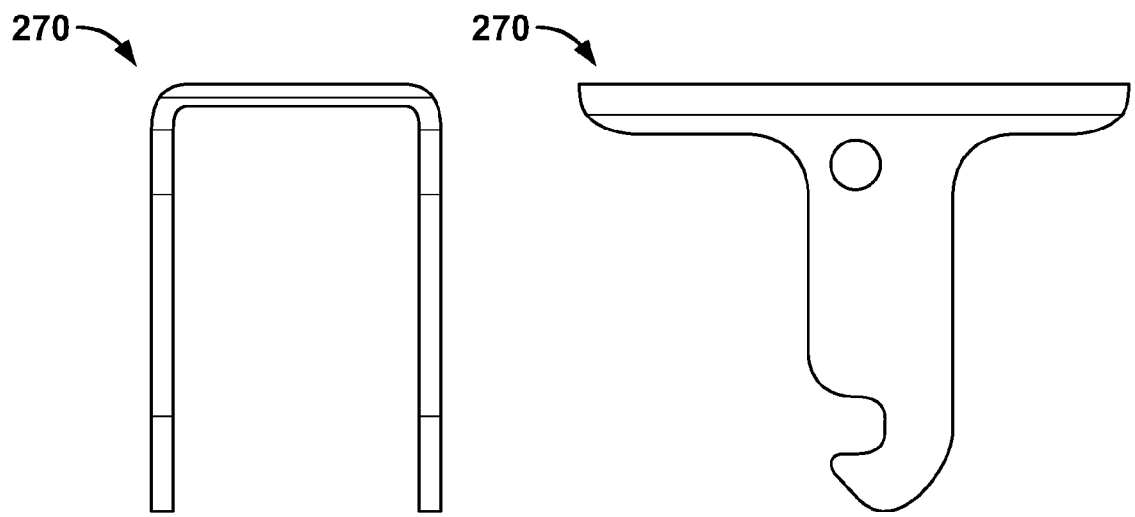
FIG. 17C     FIG. 17D

PIN LATCH WITH DETECTION DEVICE AND MOVABLE CATCH-PIN AND INTERMEDIATE POSITION WITH AUTOMATIC RETURN MECHANISM

CROSS-REFERENCE TO RELATED APPLICATIONS

The present application is a continuation of U.S. patent application Ser. No. 13/681,716 entitled "PIN LATCH WITH DETECTION DEVICE AND MOVABLE CATCH-PIN AND INTERMEDIATE POSITION WITH AUTOMATIC RETURN MECHANISM", filed on Nov. 20, 2012, the entirety of which is incorporated herein by reference, and which relates to and claims the benefit of U.S. Provisional Patent Application Ser. No. 61/566,254, filed Dec. 2, 2011, the entirety of which is incorporated herein by reference.

FIELD OF THE INVENTION

The present invention relates to pin latches, and, more particularly, to pin latches having a pin interference detection and avoidance device, a movable catch-pin mechanism, and an intermediate position with an automatic return mechanism.

BACKGROUND OF THE INVENTION

Removable and moveable elements installed on exterior surfaces of aerospace vehicles, such as hatches, fan cowl doors and other doors, access panels, engine cowlings, nacelles, and radomes employ latches. A handle mounted on the latch is used to open or close the element. A typical pin latch has two positions: a closed position and an open position. In instances where there is a non-ready or a misalignment condition between the pin latch and a keeper attached to an external structure, the closing of the pin latch will result in the pin latch interfering with, rather than latching on, the keeper.

SUMMARY OF THE INVENTION

In an embodiment, a pin latch, comprising a guide block; a handle attached pivotally to the guide block, the handle including a trigger; and a shear pin housed slidably within the guide block and connected to the handle, the shear pin including a catch-pin that is slidable between an engageable position and a disengageable position; wherein the handle is moveable between a closed position, in which the handle is retained releasably within the guide block, the shear pin is extended from the guide block, and the trigger is engaged with the catch-pin of the shear pin when the catch-pin is in its engageable position, and an open position, in which the handle is retracted from the guide block, the trigger is disengaged from the catch-pin, and the shear pin is retracted within the guide block and the catch-pin is moved to its disengageable position. In an embodiment, the guide block includes a first end, a second end opposite the first end, and a tubular potion extending from the first end to the second end of the guide block and having a pair of opposed sidewalls, each of which includes a slot extending proximate from the second end of the guide block to a point intermediate the first and second ends of the guide block, wherein the shear pin is housed slidably within the tubular portion of the guide block, and wherein the catch-pin of the shear pin is positioned slidably and guided within the slots of the pair of sidewalls of the tubular portion of the guide block.

In an embodiment, the pin latch includes a link having a first end and a second end opposite the first end of the link, the first end of the link being attached pivotally to the handle and the second end of the link being attached to the shear pin. In an embodiment, the tubular portion of the guide block includes a top wall extending between the pair of sidewalls thereof and having a top slot extending from the second end of the guide block to a point intermediate the first and second ends of the guide block, wherein the shear pin includes a first end, a second end opposite the first end of the shear pin, an interior portion extending from the second end of the shear pin to a point intermediate the first and second ends of the shear pin, and a top slot in communication with the interior portion of the shear pin, and wherein the second end of the link extends through the top slot of the tubular portion of the guide block and the top slot of the shear pin. In an embodiment, the tubular portion of the guide block includes an aperture formed within a first end of the tubular portion, and wherein the shear pin is sized and shaped to slide through the aperture.

In an embodiment, the shear pin includes a pair of opposed elongated slots and a pin housed within the elongated slots, and wherein the second end of the link is attached pivotally to the shear pin proximate to the second end thereof by the pin. In an embodiment, the trigger includes a pair of detents each of which includes a slot that is sized and shaped to receive the catch-pin of the shear pin when the catch-pin is in its engageable position. In an embodiment, the handle includes a back spring, wherein the handle is moveable from its closed position to its open position when the trigger is depressed to release the detents of the trigger from the catch-pin of the shear pin, and wherein the handle is automatically moved to its open position via the back spring. In an embodiment, the trigger includes a trigger spring.

In an embodiment, the pin latch includes a compression spring positioned within the interior portion of the shear pin and acting against the second end of the link, wherein when the handle is in its closed position, the shear pin is driven against and compresses the compression spring, and wherein when the handle is in its open position, the compression spring expands and acts against the second end of the link. In an embodiment, the pin latch includes at least one side plate that connects the guide block and the handle to one another, wherein the at least one side plate includes a first end connected to the guide block, and a second end opposite the first end of the at least one side plate, wherein the handle is connected pivotally to the second end of the at least one side plate. In an embodiment, the at least one side plate includes a pair of side plates, wherein one of the side plates is attached to one side of the guide block, and the other of the side plates is attached to an opposite side of the guide block. In an embodiment, the guide block includes a mounting block for mounting the pin latch to an external structure.

In an embodiment, a pin latch comprising a guide block having a first end, a second end opposite the first end, a tubular portion extending between the first and second ends, the tubular portion including a top wall having a first slot extending axially intermediate the first and second ends, and a bottom wall opposite the top wall and having a slot extending axially intermediate the first and second ends, and a stop pin having one end positioned slidably within the first slot of the top wall of the tubular portion of the guide block, and an opposite end positioned slidably within the slot of the bottom wall of the tubular portion of the guide block; a guide block spring positioned within the tubular portion of the guide block and intermediate the second end of the guide block and the stop pin, wherein the guide block includes a finger attached rotatably thereto; a handle connected pivotally to the guide block, the handle including a trigger; a shear pin housed slidably within the guide block and connected to the handle, wherein the shear pin includes a groove that is sized and shaped to receive the finger when the pin latch is in an unlatchable position; and a bracket connected to the shear pin and connected pivotally and slidably to the guide block, the bracket including at least one catch-pin, wherein the handle is moveable between a closed position, in which the handle is retained releasably to the guide block, the shear pin is extended from the guide block, and the trigger is engaged with the at least one catch-pin of the bracket, and an open position, in which the handle is retracted from the guide block, the trigger is disengaged from the catch-pin, and the shear pin is retracted within the guide block, wherein the handle is further moveable to an intermediate position, in which the handle is retained releasably in a position between its closed position and its open position such that when the handle is moved from its closed position to its intermediate position, the trigger is disengaged from the at least one catch-pin of the bracket and the shear pin engages the stop pin and the guide block spring acts on the stop pin in order to retain releasably the handle in its intermediate position.

In an embodiment, the finger includes a tip and a follower end opposite the tip, and wherein the groove includes a recess that is sized and shaped to receive the follower end when the follower end is positioned adjacent to the recess. In an embodiment, the finger includes a coil finger spring for biasing the follower end of the finger. In an embodiment, the pin latch is adapted to be installed within a latch fitting on a door, wherein the door includes a keeper having a guide, a cavity, and a ram, wherein the cavity is sized and shaped to receive slidably the shear pin. In an embodiment, when the shear pin and the cavity of the keeper are aligned with one another, and when the handle is in its intermediate position, the tip of the finger contacts the ram of the door in order to prevent the coil finger spring from rotating the follower end of the finger into the recess of the groove of the shear pin, thereby enabling the handle to be rotated to its closed position and the shear pin to extract into the cavity of the keeper. In an embodiment, when the shear pin and the cavity of the keep are misaligned with one another, and when the handle is in its intermediate position, the finger spring acts on and rotates the follower-end of the finger into the recess of the groove of the shear pin, thereby preventing the handle from being rotated to its closed position and the shear pin from being further extracted from the guide block.

BRIEF DESCRIPTION OF THE DRAWINGS

For a more complete understanding of the present invention, reference is made to the following detailed description of exemplary embodiments considered in conjunction with the accompanying drawings, in which:

FIG. 10A is a side elevational view of the pin latch shown in FIG. 1, with portions thereof shown broken away and cross-sectioned for the purposes of clarity, and shown in a closed position with a shear pin employed by the latch fully extracted and a trigger catching a trigger pin;

FIG. 10B is a side elevational view of the pin latch shown in FIG. 1, with portions thereof shown cross-sectioned, and shown in a closed position, but with the shear pin retracted and the catch pin clearing the trigger;

FIGS. 17A through 17D are various views of a trigger employed by the pin latch shown in FIG. 12;

DETAILED DESCRIPTION OF THE DRAWINGS

Figure 1:
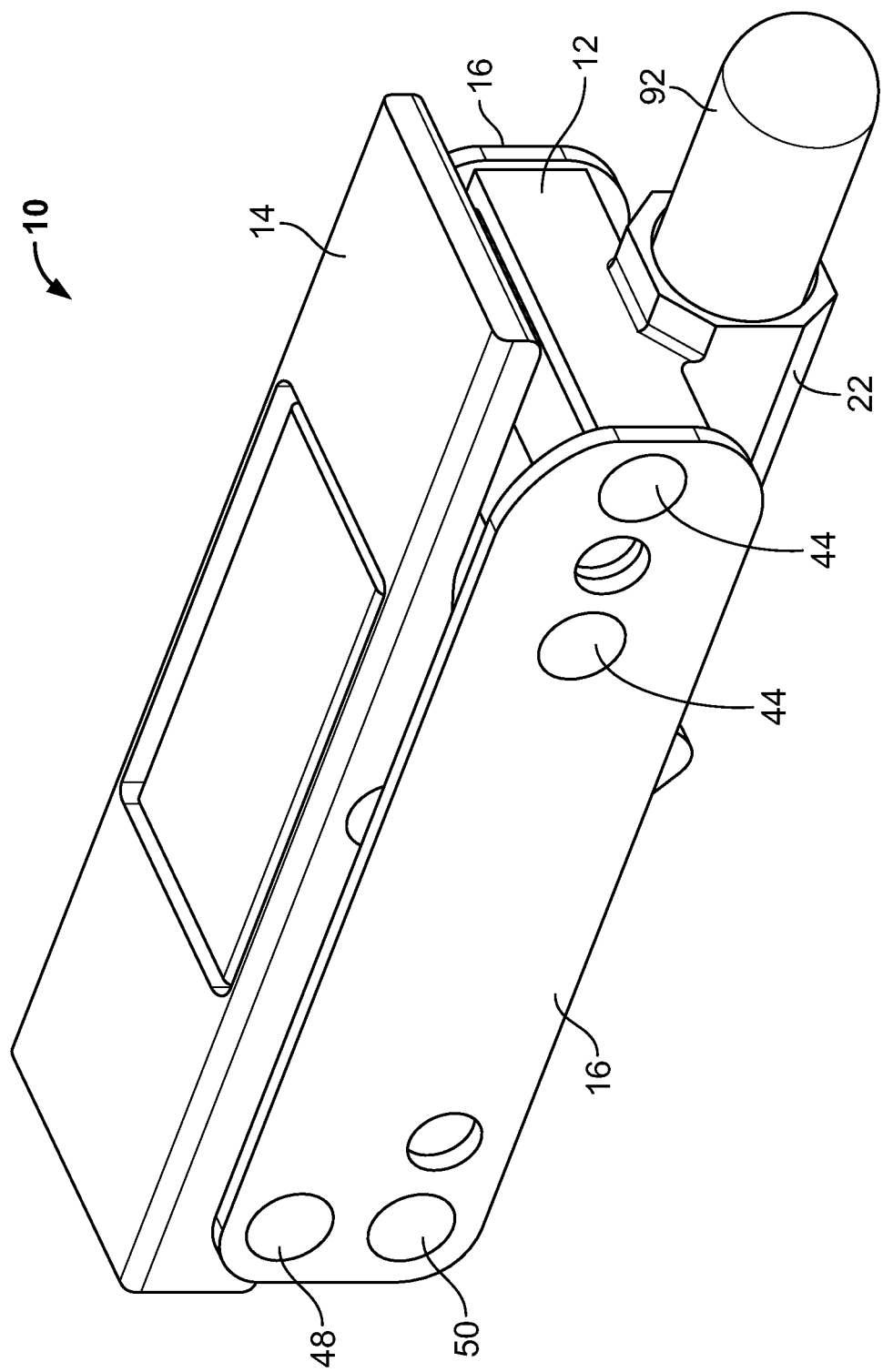
FIG. 1 is a top perspective view of a pin latch constructed in accordance with an embodiment of the present invention, the pin latch being shown in a closed position.
Figure 2:
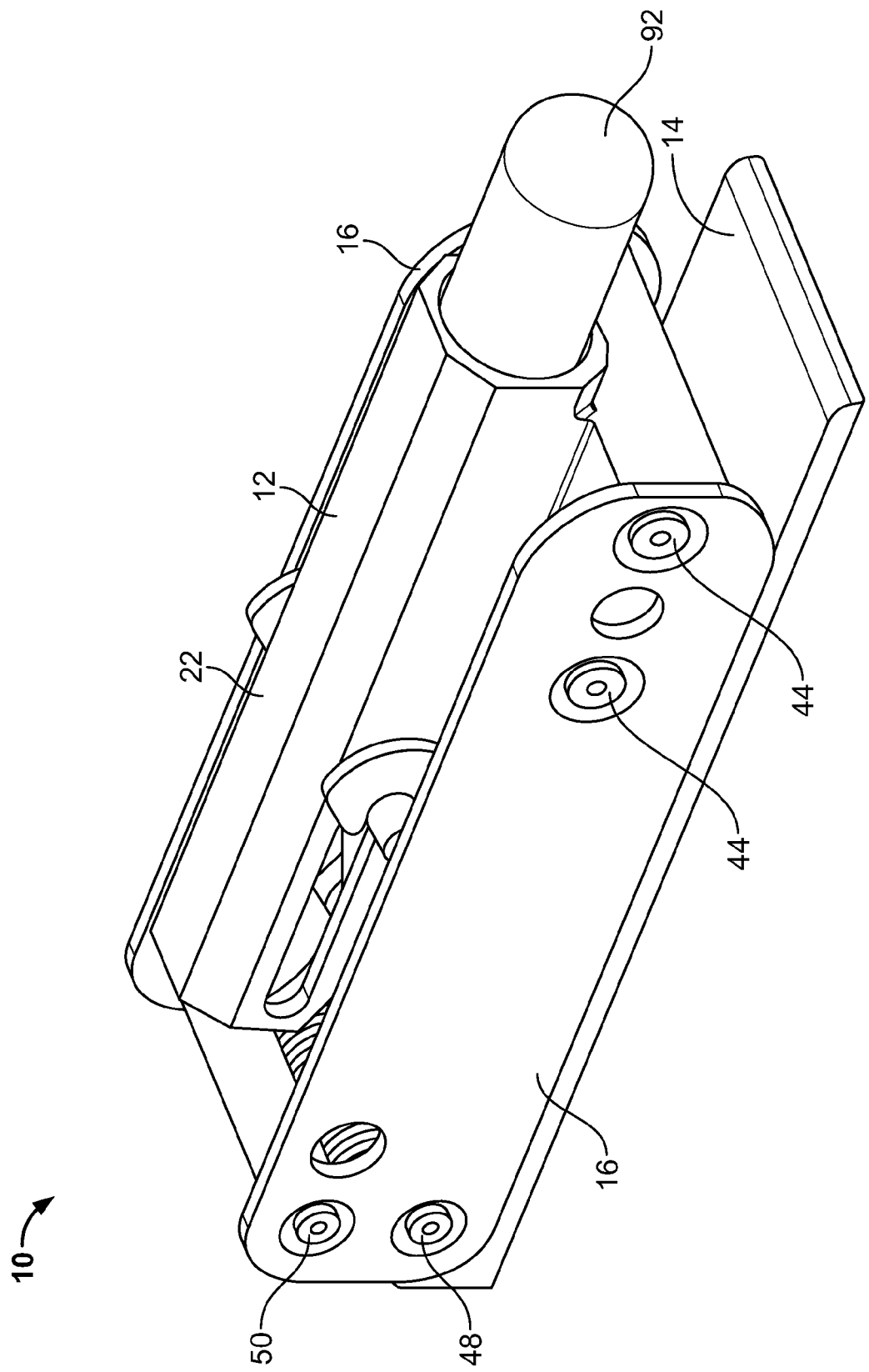
FIG. 2 is a bottom perspective view of the pin latch shown in FIG. 1.
Figure 3:
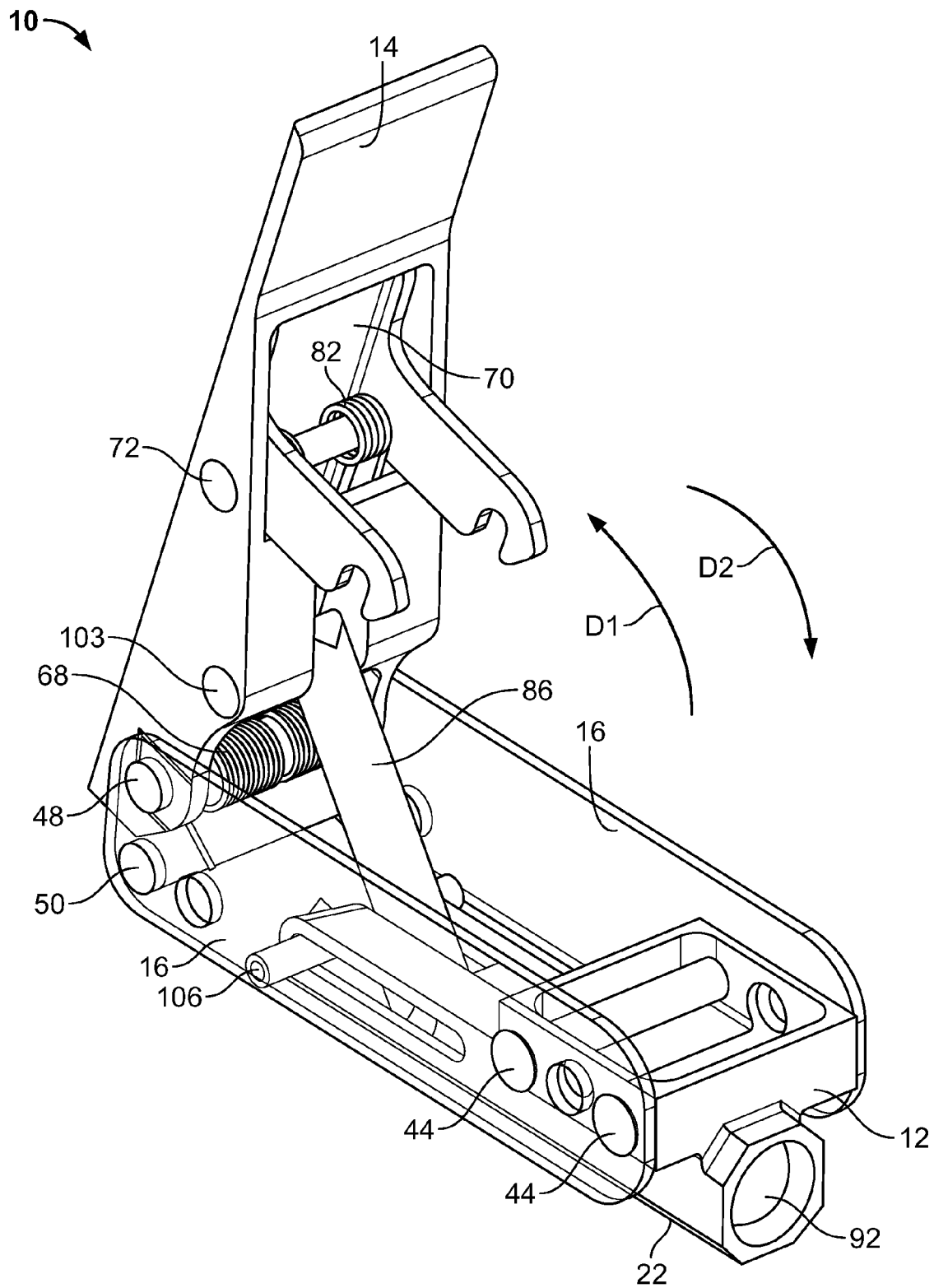
FIG. 3 is top perspective view of the pin latch shown in FIG. 1, the pin latch being shown in an open position and with portions thereof being shown transparent for the purposes of clarity.
Figure 4B:
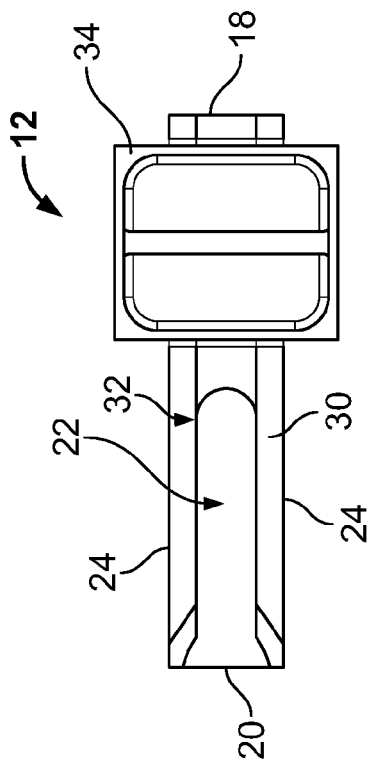
FIGS. 4A through 4D are various views of a guide block employed by the pin latch shown in FIG. 1.
Figure 4D:
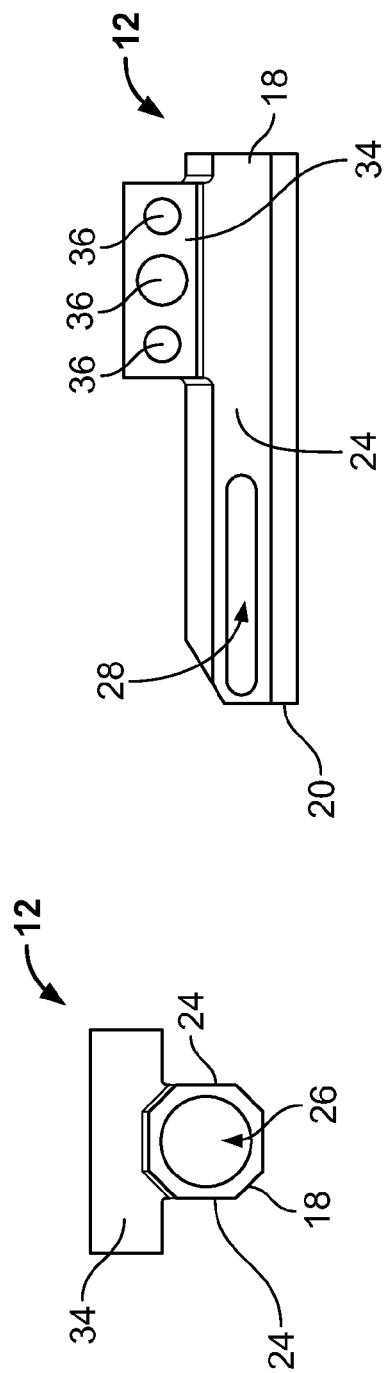
Figure 4A:
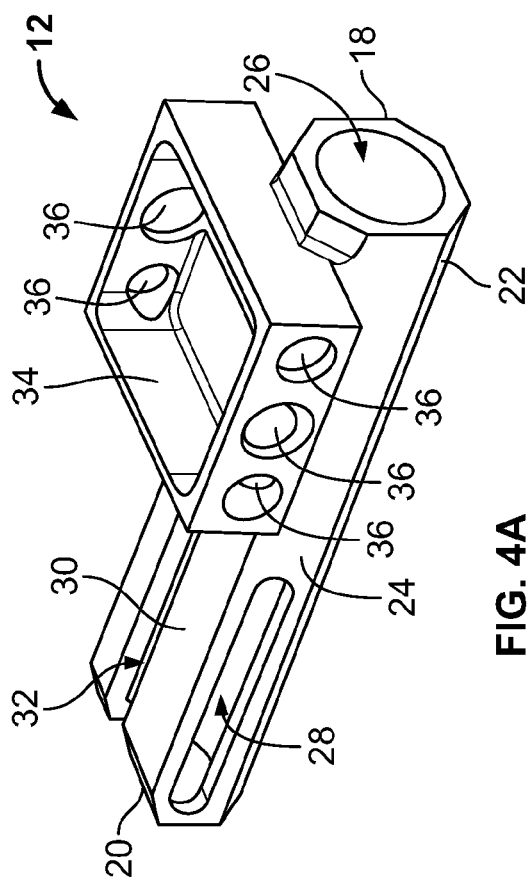
Figure 4C:

Referring to FIGS. 1 through 3, in an embodiment, a pin latch 10 includes a guide block 12, a handle 14, and a pair of side plates 16 that connect the guide block 12 and the handle 14 to one another. In an embodiment, one of the side plates 16 is attached to one side of the guide block 12 and the other of the side plates 16 is attached to an opposite side of the guide block 12. In an embodiment, the pin latch 10 includes at least one of the side plates 16. In an embodiment, the handle 14 is connected pivotally to the side plates 16 and pivots relative to the guide block 12 between a closed position, in which the handle 14 is releasably retained to the guide block 12 and is juxtaposed thereto (see FIGS. 1 and 2), and an open position, in which a free end of the handle 14 fully extends away from the guide block 12 (see FIG. 3). In another embodiment, the handle 14 is connected pivotally directly to the guide block 12. The structure and function of the guide block 12, the handle 14, and the side plates 16 shall be described in further detail below.

Referring to FIGS. 4A through 4D, the guide block 12 includes a first end 18 and a second end 20 opposite the first end 18. In an embodiment, a tubular portion 22 extends from the first end 18 to the second end 20, and includes a pair of sidewalls 24. In an embodiment, the tubular portion 22 terminates at a circular-shaped aperture 26 located at the first end 18 of the guide block 12. In an embodiment, each of the sidewalls 24 includes an elongated slot 28 extending axially and from proximate to the second end 20 to a point intermediate the first and second ends 18, 20 of the guide block 12. In an embodiment, the guide block 12 includes a top wall 30 having an elongated slot 32 extending from the second end 20 to a point intermediate the first and second ends 18, 20. In an embodiment, the guide block 12 includes a mounting block 34 having a plurality of apertures 36, whose purpose shall be described hereinafter. In an embodiment, the guide block 12 includes mounting brackets that enable the pin latch 10 to be mounted to an external structure (not shown in the Figures). In another embodiment, as described below, the pin latch 10 may be installed in a latch fitting 110 (see, for example, FIG. 11).

Figure 5A:
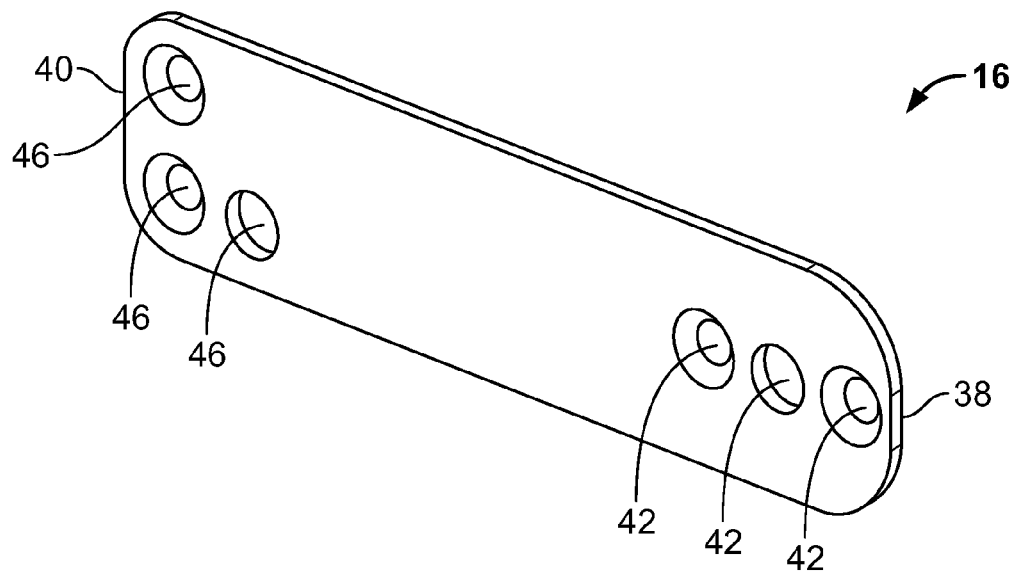
FIGS. 5A and 5B are perspective and side views, respectively, of one of a pair of side plates employed by the pin latch shown in FIG. 1, the other of the pair of side plates being identical in size and shape.
Figure 5B:
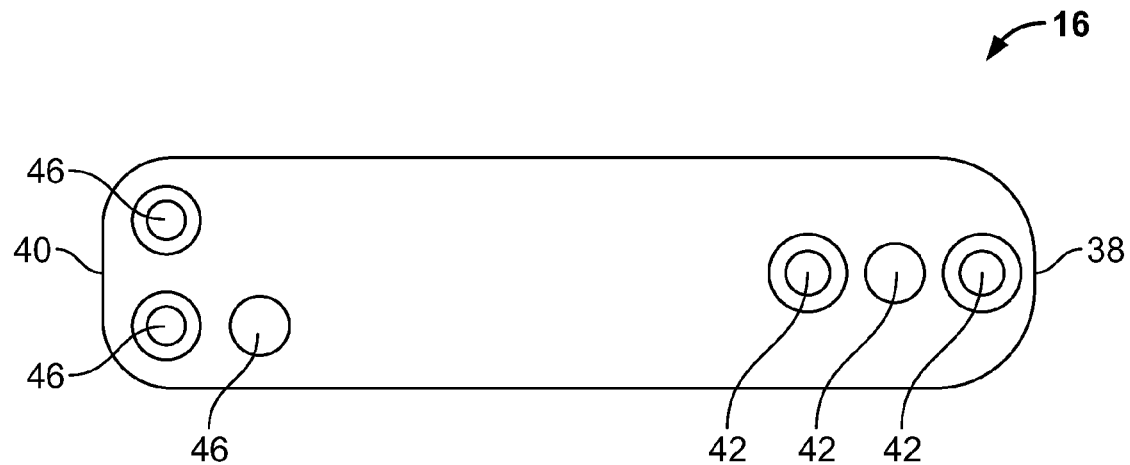
Figure 6B:
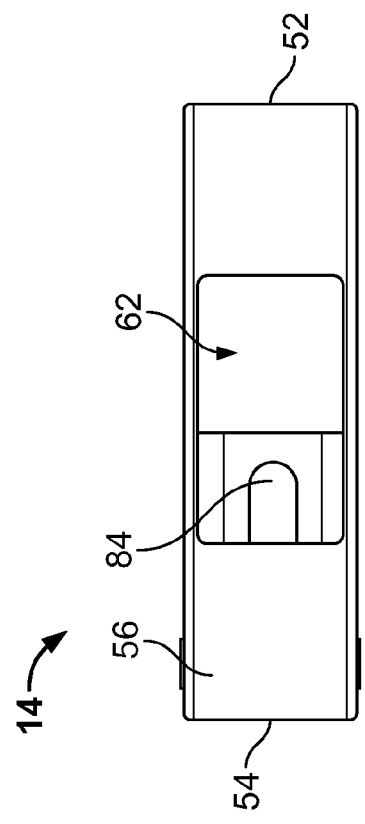
FIGS. 6A through 6D are various views of a handle employed by the pin latch shown in FIG. 1.
Figure 6D:
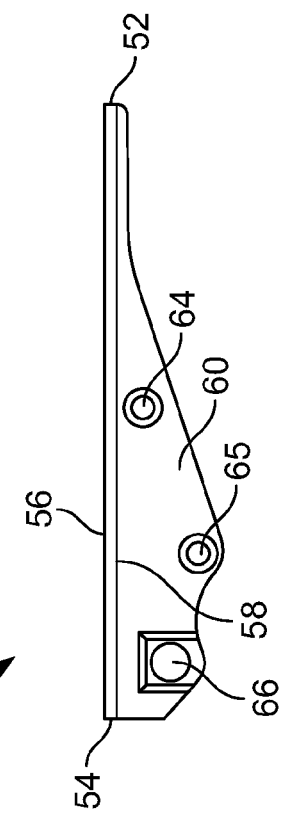
Figure 6A:
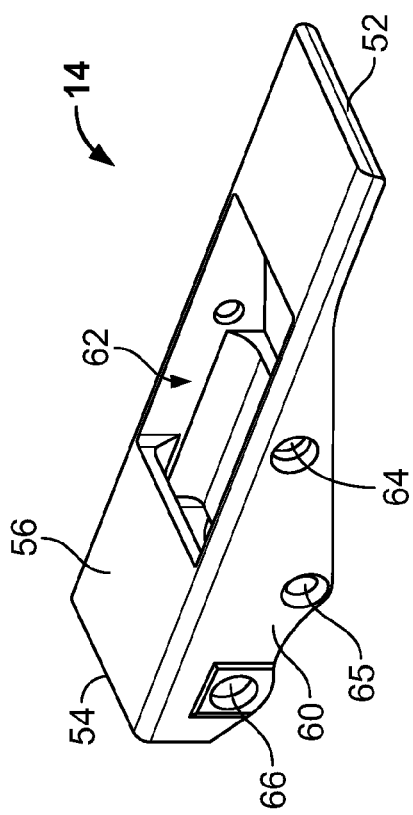
Figure 6C:
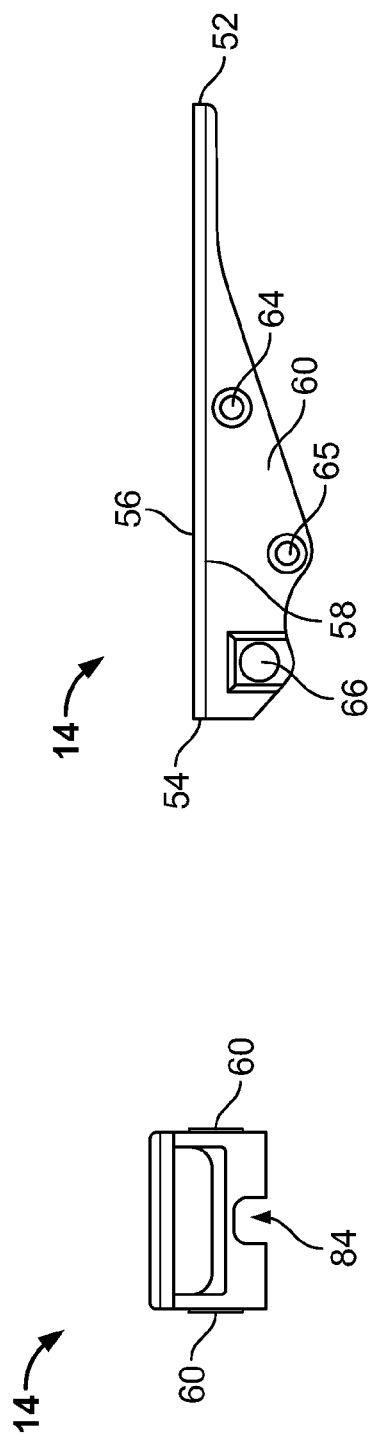
Figure 7A:
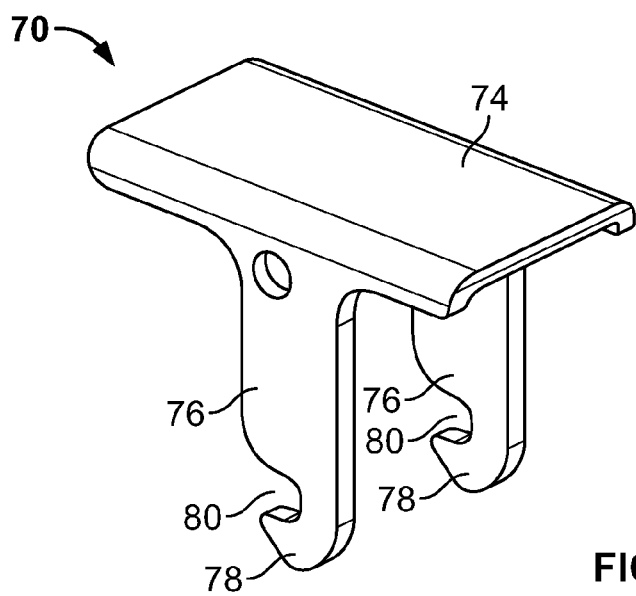
FIGS. 7A through 7D are various views of a trigger employed by the pin latch shown in FIG. 1.
Figure 7B:
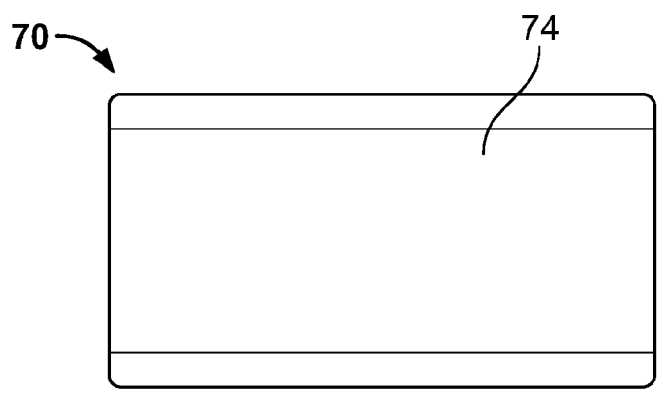
Figure 7C:
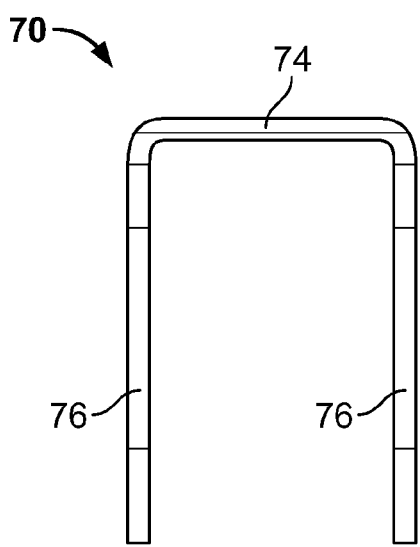
Figure 7D:
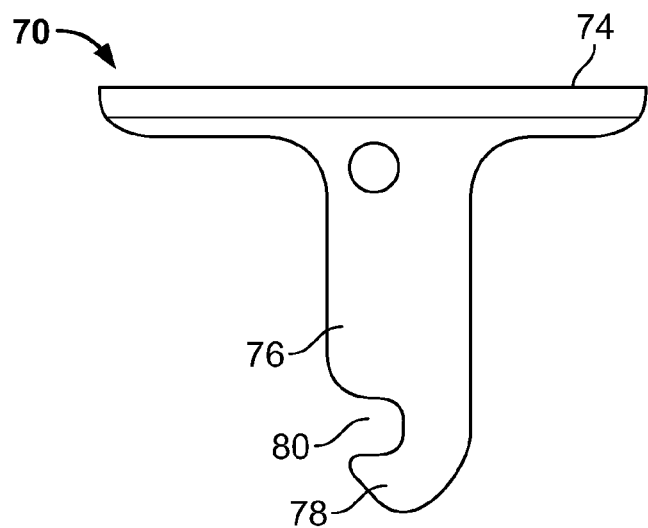
Figure 8A:
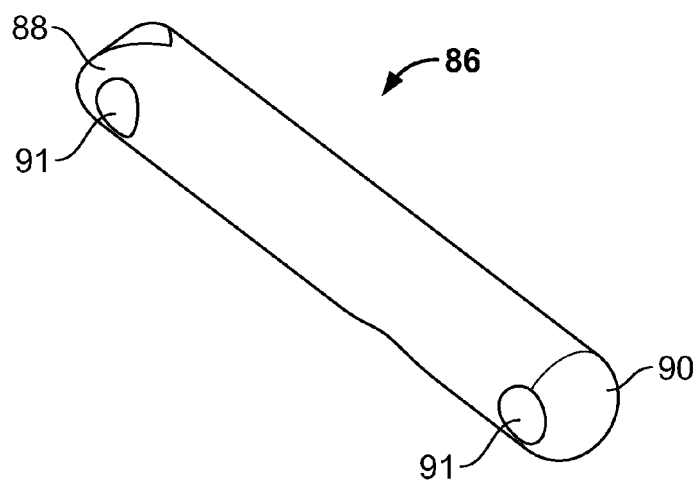
FIGS. 8A through 8D are various views of a link employed by the pin latch shown in FIG. 1.
Figure 8B:
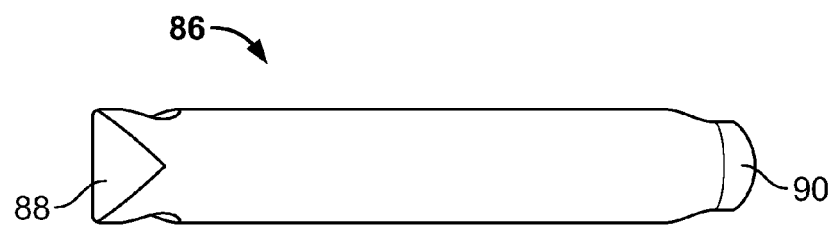
Figure 8C:
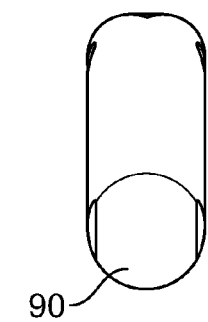
Figure 8D:
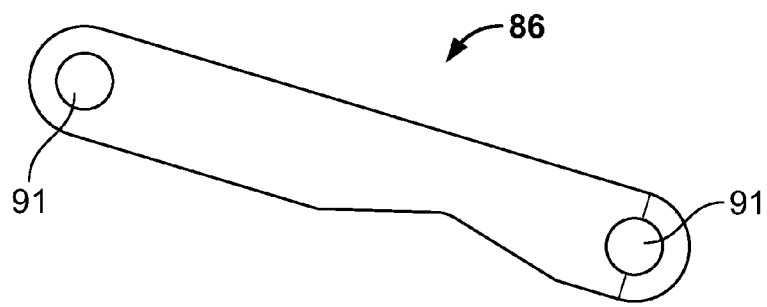

Referring to FIGS. 5A and 5B, in an embodiment, each of the side plates 16 includes a first end 38 and a second end 40 opposite the first end 38. In an embodiment, each of the side plates 16 includes a first plurality of apertures 42 positioned longitudinally and linearly relative to one another and located proximate to the first end 38. In an embodiment, each of the apertures 42 is sized and shaped to receive a rivet 44 (which is shown in FIGS. 1 through 3) for attachment of the side plates 16 to the bracket 34 of the guide block 12. In an embodiment, each of the side plates 16 includes a second plurality of apertures 46 formed proximate to the second end 40, one of which is sized and shaped to receive a handle pivot pin 48 for attachment to the handle 14, and another of which is sized and shaped to receive a bushing 50 (which is shown in FIGS. 1 through 3). In an embodiment, one of the first plurality of apertures 42 and one of the second plurality of apertures 46 may be used as a "spare" for mounting the side plates 16 to different sized and shaped guide blocks 12.

Referring to FIGS. 6A through 6D, in an embodiment, the handle 14 includes a first end 52 and a second end 54 opposite the first end 52, an exterior surface 56, an interior surface 58 (see FIG. 6D), and opposing side members 60. In an embodiment, the handle 14 includes a rectangular-shaped aperture 62 extending from the exterior surface 56 to the interior surface 58. In an embodiment, each of the opposing side members 60 includes a trigger pin aperture 64 and a rivet aperture 65, each being positioned intermediate the first and second ends 52, 54 of the handle 14, and a pivot pin aperture 66 positioned proximate to the second end 54 of the handle 14. In an embodiment, the second end 54 of the handle 14 is attached pivotally to the second ends 40 of the side plates 16 by the handle pivot pin 48, which extends through the apertures 66 of the opposing side members 60. In an embodiment, a back spring 68 surrounds the handle pivot pin 48 and engages the bushing 50 and the interior surface 58 of the handle 14 (see FIG. 3) in order to maintain it in its open position, which will be described in greater detail below. In embodiment, the handle 14 includes a central slot 84 formed within the underside thereof (see FIGS. 6B and 6C), whose purpose shall be described hereinafter.

Referring to FIGS. 3 and 7A through 7D, in an embodiment, the handle 14 includes a trigger 70 mounted pivotally therein by a trigger pivot pin 72 (see FIG. 3) which is fitted within the trigger pin apertures 64 of the opposing side members 60 of the handle 14. In an embodiment, the trigger 70 includes a rectangular-shaped top portion 74 that is sized and shaped to mate with the aperture 62 of the handle 14, and a pair of opposing detents 76, each having a cupped tip 78 and a slot 80, and depending from the top portion 74 of the trigger 70. In an embodiment, the trigger 70 includes a trigger spring 82 mounted to the trigger pivot pin 72 (see FIG. 3).

Referring to FIGS. 8A through 8D, in an embodiment, the pin latch 10 includes an elongated link 86 having a first end 88 and a rounded second end 90 opposite the first end 88. In an embodiment, each of the ends 88, 90 includes an aperture 91 for receiving pins to be described below. Referring to FIGS. 9A through 9D, in an embodiment, the pin latch 10 includes a shear pin 92 having a free first end 94 and a second end 96 opposite the first end 94. In an embodiment, the shear pin 92 is received slidably within the tubular portion 22 and through the aperture 26 of the guide block 12

Figure 9A:
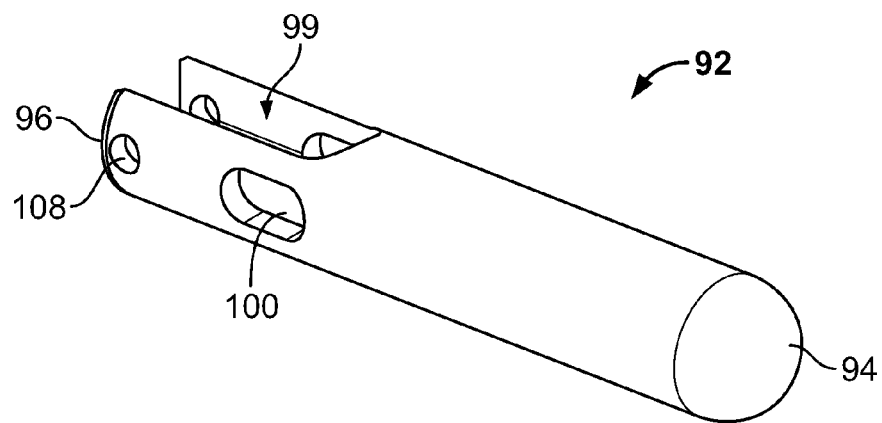
FIGS. 9A through 9D are various views of a shear pin employed by the pin latch shown in FIG. 1.
Figure 9B:
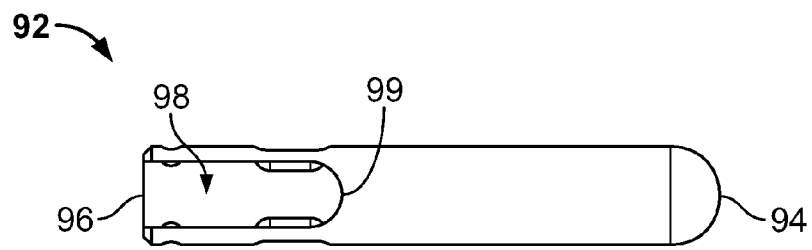
Figure 9C:
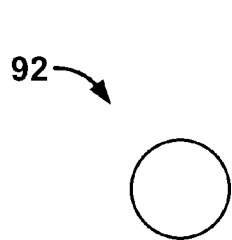
Figure 9D:
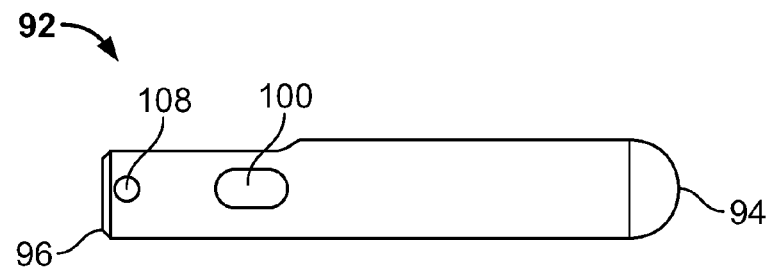

(see FIGS. 1 through 3). In an embodiment, the shear pin 92 includes a hollow interior portion 98 extending from the second end 96 to a point intermediate the first and second ends 94, 96. In an embodiment, the interior portion 98 is accessed by a top slot 99. In an embodiment, the shear pin 92 includes a pair of opposed elongated slots 100 that house a pin 102 (which is shown in FIGS. 10A and 10B). In an embodiment, the first end 88 of the link 86 is attached to the handle 14 within the central slot 84 thereof by a pin 103 through the aperture 91, and the second end 90 of the link 86 extends through the slot 32 of the guide block 12 and the slot 99 of the shear pin 92 and is attached pivotally to the shear pin 92 proximate to the second end 96 thereof by the pin 102 through the aperture 91 (see FIGS. 3, 10A and 10B). In an embodiment, the shear pin 92 includes a spring 104 which nests inside the interior portion 98 of the shear pin 92 and contacts the spherical second end 90 of the link 86 (see FIG. 10A). In an embodiment, the shear pin 92 includes a catch-pin 106 (see FIGS. 10A and 10B) located at the second end 96 thereof and positioned within opposed end holes 108 located on the sides of the shear pin 92 (FIGS. 9A, 9B and 9C). In an embodiment, the catch-pin 106 is riveted in the end hole 108 of the shear pin 92 and is slidably positioned and guided horizontally within the slots 28 of the guide block 12 and by the side plates 16.

In an embodiment, the guide block 12, the handle 14, and the side plates 16 are fabricated from stainless steel, but other suitable materials can be used. In an embodiment, all other structural elements depicted in the Figures may also be fabricated from suitable grade stainless steel or other suitable alloy metal.

Figure 11:
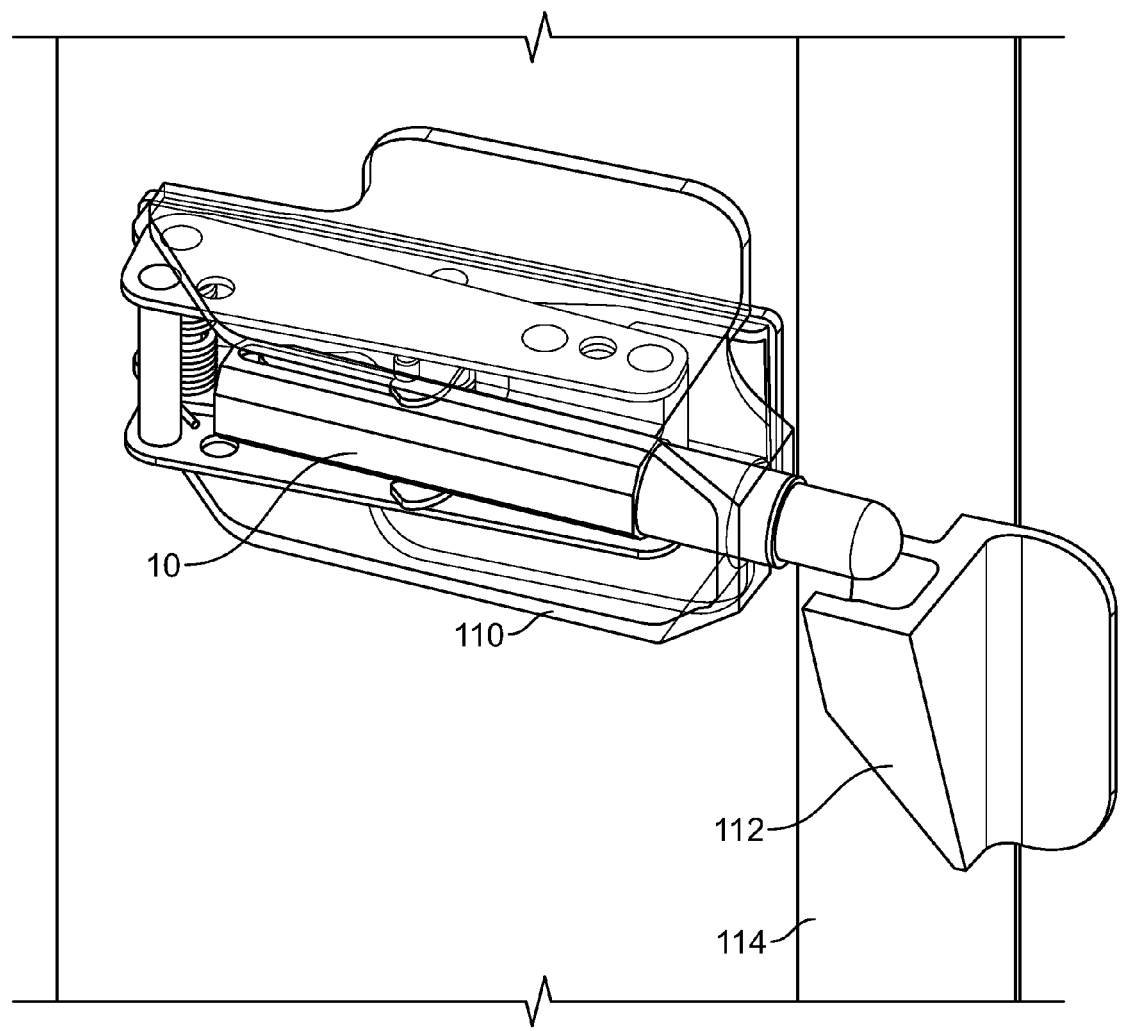
FIG. 11 illustrates the pin latch shown in FIG. 1 installed within a latch fitting and on a fan cowl door.

Referring to FIG. 10A, the pin latch 10 is shown in its closed position. While in the closed position, the exterior surface 56 of the handle 14 is flush or substantially flush with an exterior surface of an external structure to which the pin latch 10 is attached (not shown in the Figures). In an embodiment, the shear pin 92 is in its fully extended (extracted) position, i.e., the first end 94 of the shear pin 92 is positioned at a maximum distance from the guide block 12. In an embodiment, the shear pin 92 is sized and shaped to engage the external structure. In an embodiment, as shown in FIG. 11, the shear pin 92 is sized and shaped to engage a keeper 112 of a fan cowl door 114. In addition, the trigger 70 engages the catch-pin 106 such that catch-pin 106 engages the slots 80 of the detents 76. In an embodiment, the trigger 70 is spring-loaded via the trigger spring 82 (as shown in FIG. 3).

Referring to FIGS. 3, 10A and 10B, in an embodiment, the pin latch 10 is opened by pressing the trigger 70, wherein the tips 78 of the trigger 70 are released from the catch-pin 106, freeing the handle 14 to rotate outwardly in direction D1 from the exterior surface of the structure (see FIG. 3). In an embodiment, when the trigger 70 is pushed, the handle 14 automatically and freely opens via the back spring 68. When the handle 14 is rotated in this manner, the link 86 is drawn and, in turn, the shear pin 92 begins to retract into the guide block 12, and thus the catch-pin 106 retracts. When the handle 14 is in the open position, as shown in FIG. 3, the shear pin 92 is in a fully retracted position within the guide block 12.

In order to close the pin latch 10, the handle 14 is rotated towards the closed position in a direction D2 (see FIG. 3) and drives the link 86 to extract the shear pin 92, and thus moves the catch-pin 106 in the direction of the shear pin 92. If the shear pin 92 interferes with the keeper 112, then the catch-pin 106 will never reach its waiting position for the trigger 70 to be able to engage the catch-pin 106. In this regard, the handle 14 will automatically rotate back to the open position via the back spring 68 on the handle 14, and, thus, signals visually an unlatching condition once the handle 14 is released.

During the fan cowl door 114 closing operation with the pin latch 10 latched, the first end 94 of the shear pin 92 engages and glides on the keeper 112. In this regard, the keeper 112 pushes the shear pin 92 against a compression spring 104 (see FIG. 10A) until the catch-pin 106 disengages the trigger 70 and allows the handle 14 to automatically rotate to its open position via the spring 68. The pin latch 10 then can be closed once the shear pin 92 moves and fully extracts in the cavity of the keeper 112.

FIGS. 12 through 26 show an embodiment of a pin latch 210. Elements illustrated in FIGS. 12 through 26 which correspond, either identically or substantially, to the elements described above with respect to the embodiment shown in FIGS. 1 through 11 have been designated by corresponding reference numerals increased by two hundred, respectively. Unless otherwise stated, the embodiment shown in FIGS. 12 through 26 is constructed, assembled, and operated in the same or a similar manner as the embodiment shown in FIGS. 1 through 11.

Figure 12:
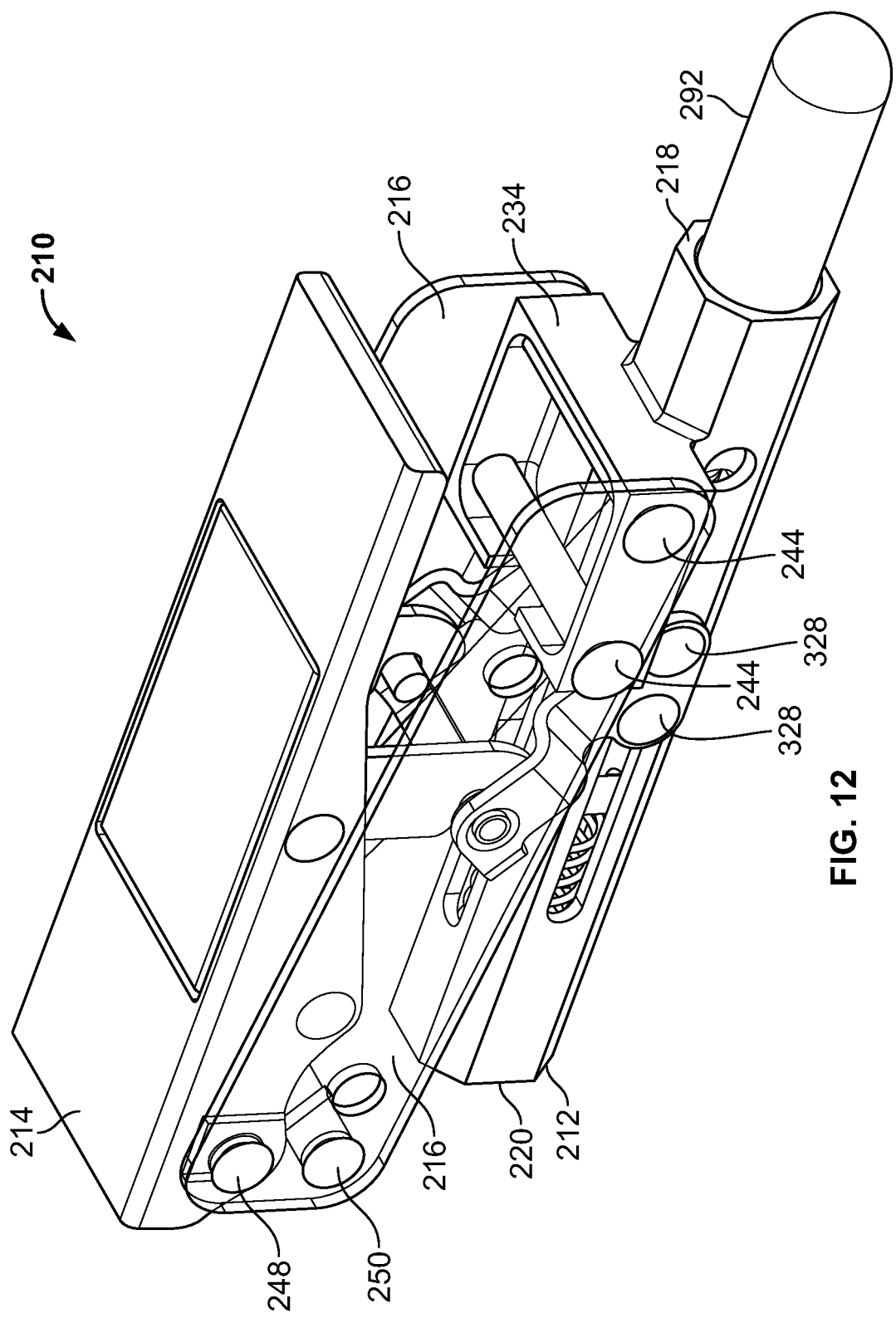
FIG. 12 is a top perspective view of a pin latch constructed in accordance with another embodiment of the present invention, the pin latch being shown in a closed position.
Figure 13:
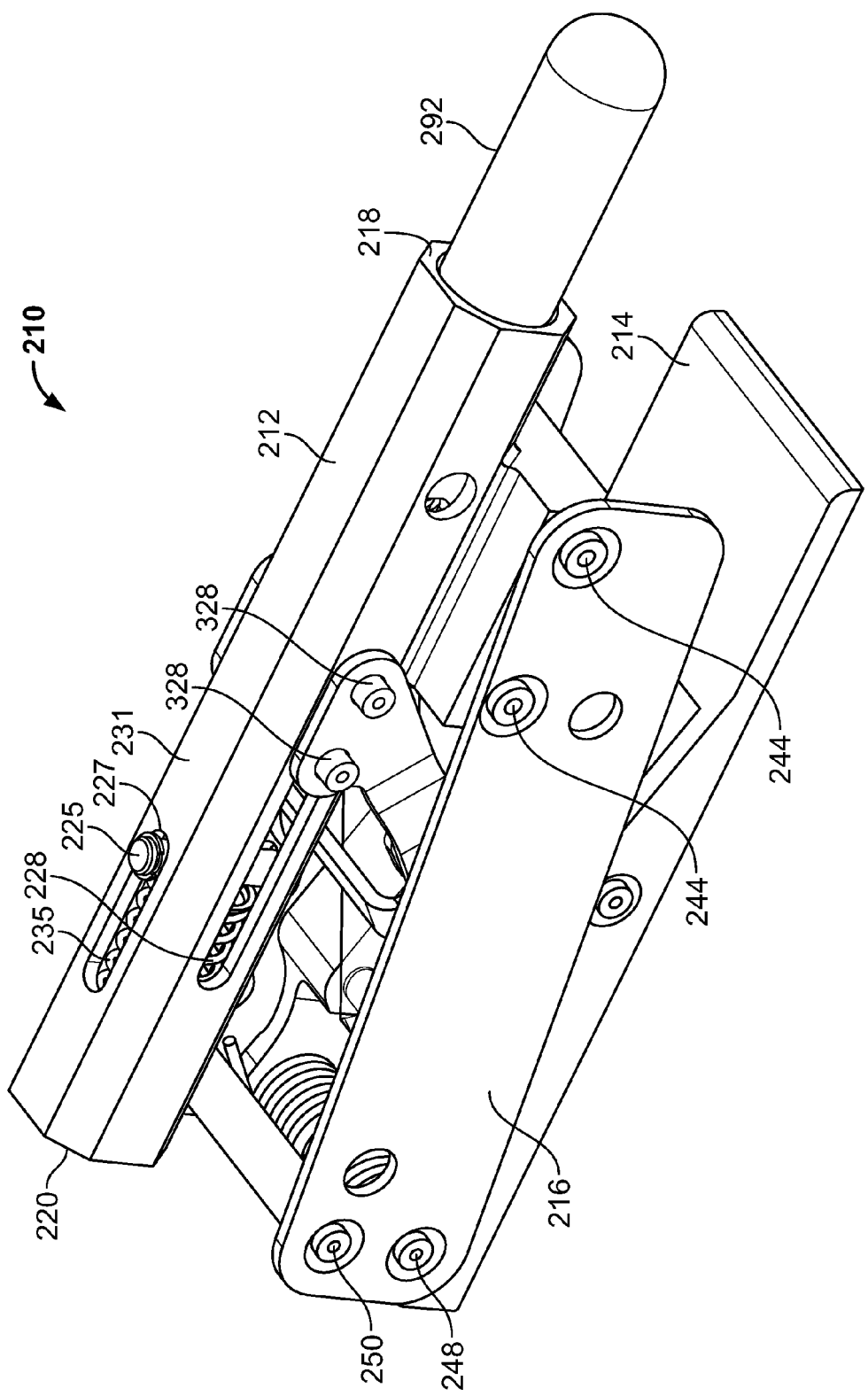
FIG. 13 is a bottom perspective view of the pin latch shown in FIG. 12.
Figure 14B:
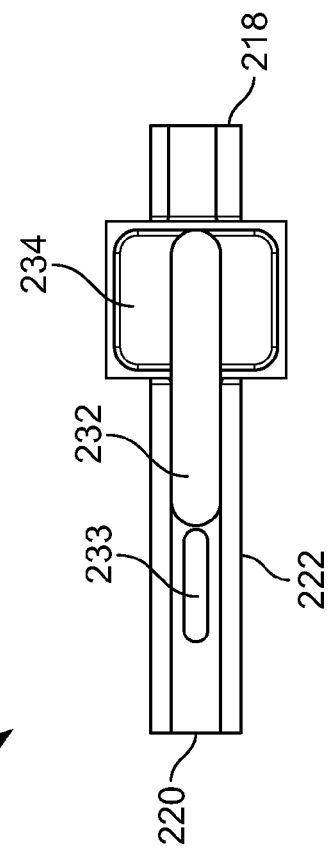
FIGS. 14A through 14D are various views of a guide block employed by the pin latch shown in FIG. 12.
Figure 14D:
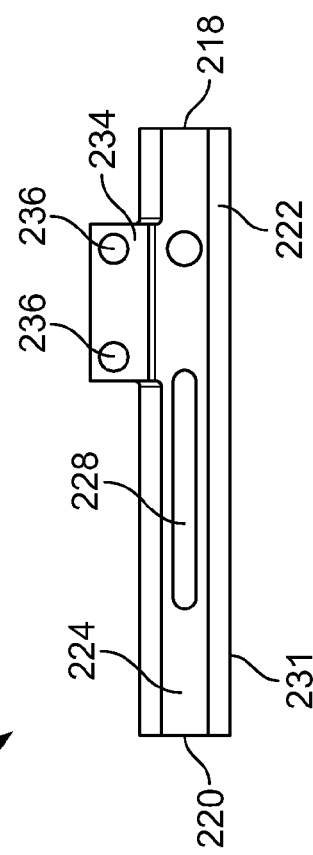
Figure 14A:
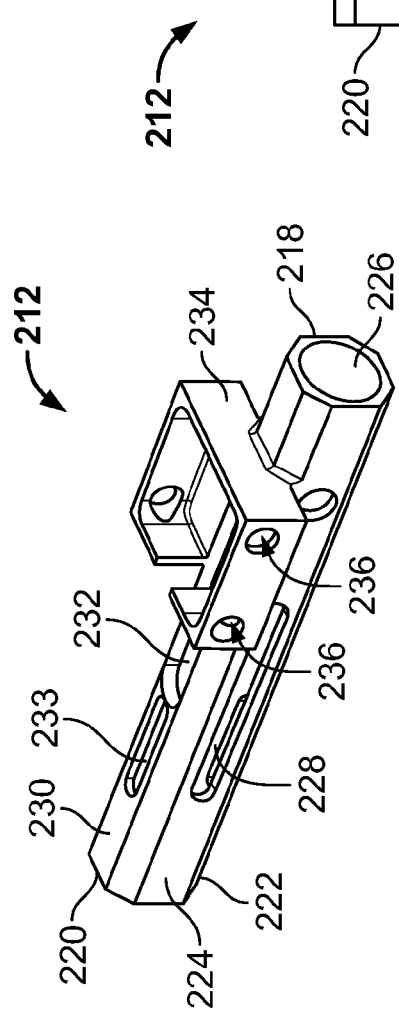
Figure 14C:
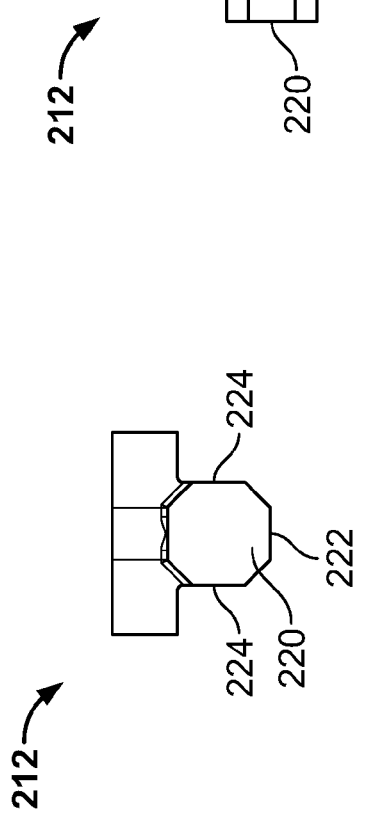

Referring to FIGS. 12 and 13, in an embodiment, the pin latch 210 includes a guide block 212, a handle 214, and a pair of side plates 216 that connect the guide block 212 and the handle 214 to one another. In another embodiment, the handle 214 is connected pivotally and directly to the guide block 212. In an embodiment, one of the side plates 216 is attached to one side of the guide block 212 and the other of the side plates 216 is attached to an opposite side of the guide block 212. In an embodiment, the handle 214 is connected pivotally to the side plates 216 and pivots relative to the guide block 212 between a closed position, in which the handle 214 is releasably retained and is juxtaposed to the guide block 212 (see FIGS. 12 and 13), and an open position, in which an end of the handle 214 fully extends away from the guide block 212 (see FIGS. 24 and 25). In an embodiment, the handle 214 may be set in an intermediate position, whereby the handle 214 is releasably retained in a position that is between its open and closed positions (see FIGS. 22 and 23). The structure and function of the guide block 212, the handle 214, and the side plates 216 shall be described in further detail below.

Referring to FIGS. 14A through 14D, the guide block 212 includes an open first end 218 and a closed second end 220 opposite the first end 218. In an embodiment, a tubular portion 222 extends from the first end 218 to the second end 220, and includes a pair of opposing sidewalls 224. In an embodiment, the tubular portion 222 terminates at a circular-shaped aperture 226 located at the first end 218 of the guide block 212. In an embodiment, each of the sidewalls 224 includes an elongated slot 228 extending axially and intermediate the first and second ends 218, 220 of the guide block 212. In an embodiment, the tubular portion 222 includes a wall 230 having a first slot 232 extending axially intermediate the first and second ends 218, 220, and a second slot 233 extending axially intermediate the first and second ends 218, 220 and juxtaposed with the second slot 233. In an embodiment, the guide block 212 includes a wall 231 opposite the wall 230 and having a slot 235 extending axially intermediate the first and second ends 218, 220 which aligns with the slot 233 (see FIG. 13). In an embodiment, a stop pin 225 is positioned slidably within the slots 233, 235 of the guide block 212 and secured therein by a retaining ring 227 (see FIG. 13). In an embodiment, a guide block spring 229 is positioned within the tubular portion 222 of the guide block 212 and nests against the closed second end 220 (see FIGS. 21A and 21B). In an embodiment, the stop pin 225 functions as a plunger against the guide block spring 229, which will be described in more detail below.

In an embodiment, the guide block 212 includes a mounting block 234 having a plurality of apertures 236, whose purpose shall be described hereinafter. In an embodiment, the guide block 212 includes mounting brackets to enable the pin latch 210 to be mounted to an external structure (not shown in the Figures). In another embodiment, as described below, the pin latch 210 may be installed in a latch fitting 310 (see FIG. 26).

Figure 15A:
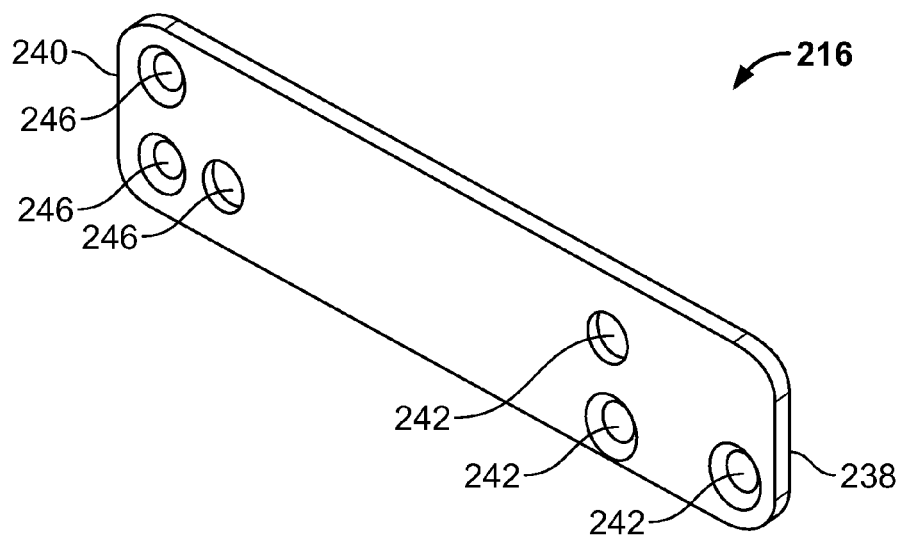
FIGS. 15A and 15B are perspective and side views, respectively, of one of a pair of side plates employed by the pin latch shown in FIG. 12, the other of the pair of side plates being identical in size and shape.
Figure 15B:
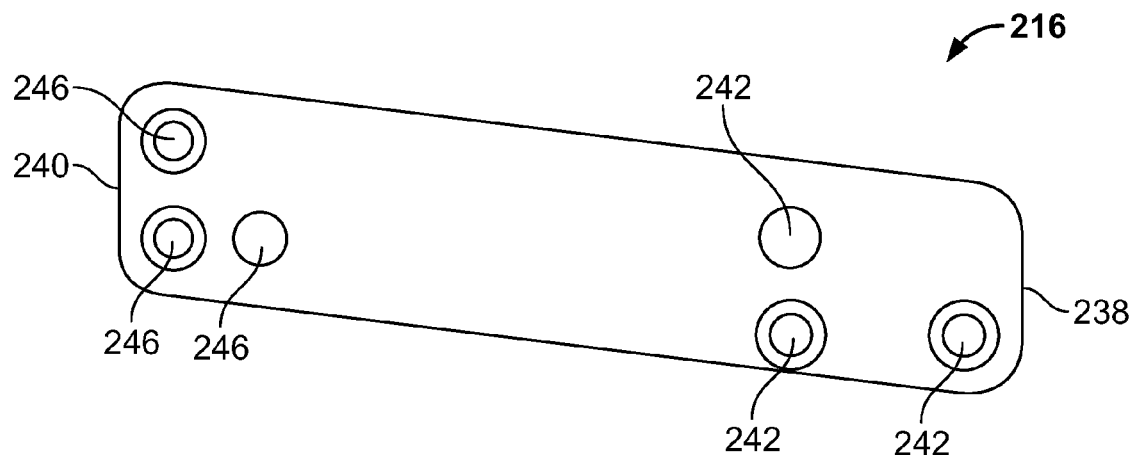
Figure 16B:
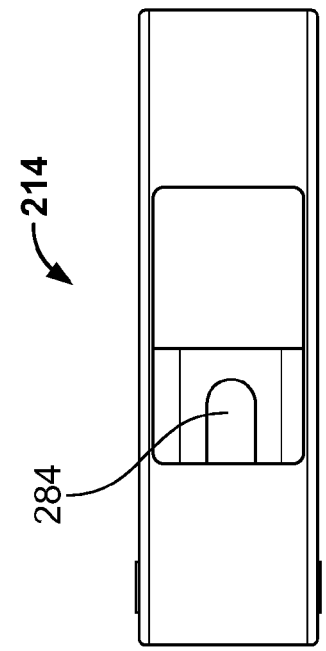
FIGS. 16A through 16D are various views of a handle employed by the pin latch shown in FIG. 12.
Figure 16D:
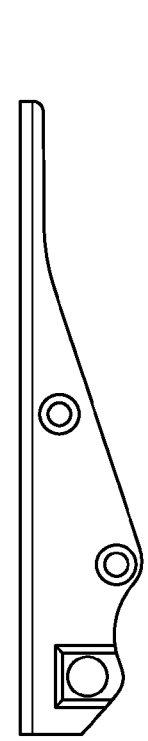
Figure 16A:
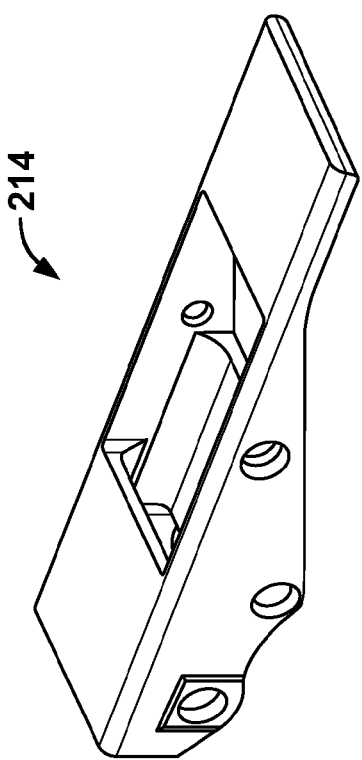
Figure 16C:
Figure 18A:
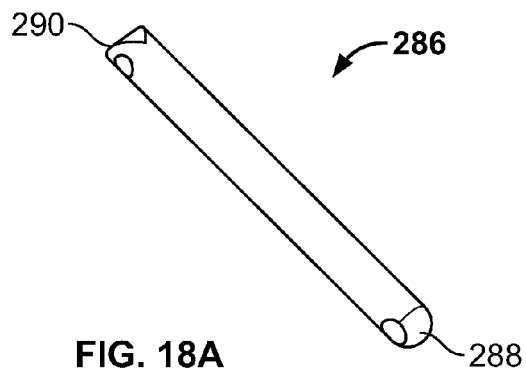
FIGS. 18A through 18D are various views of a link employed by the pin latch shown in FIG. 12.
Figure 18B:
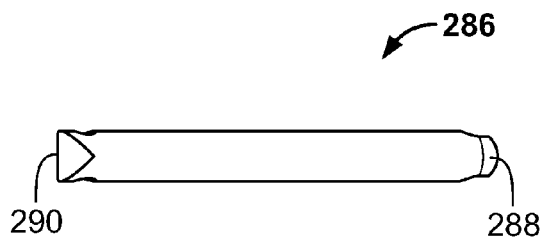
Figure 18C:
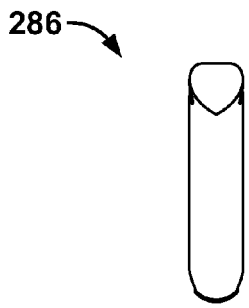
Figure 18D:
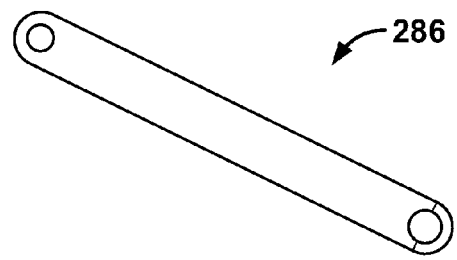
Figure 19A:
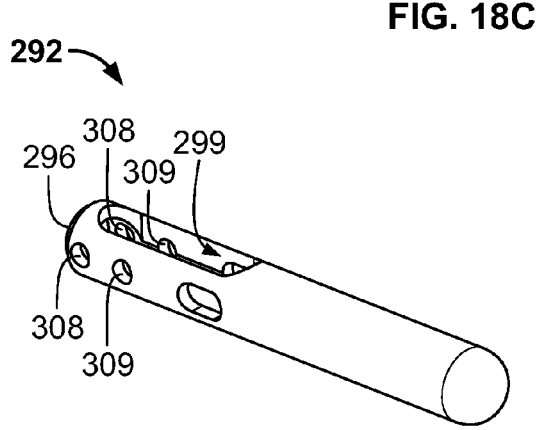
FIGS. 19A through 19D are various views of a shear pin employed by the pin latch shown in FIG. 12.
Figure 19B:
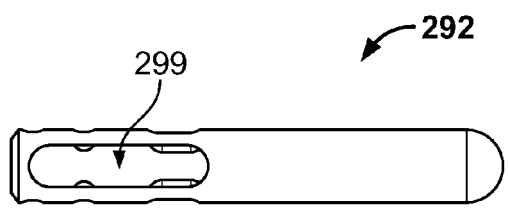
Figure 19C:
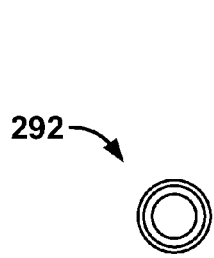
Figure 19D:
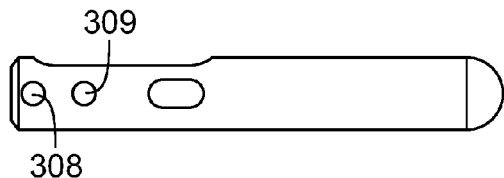
Figure 20B:
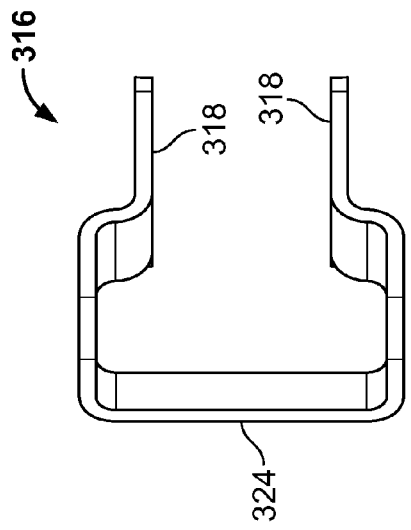
FIGS. 20A through 20D are various views of a bracket employed by the pin latch shown in FIG. 12.
Figure 20D:
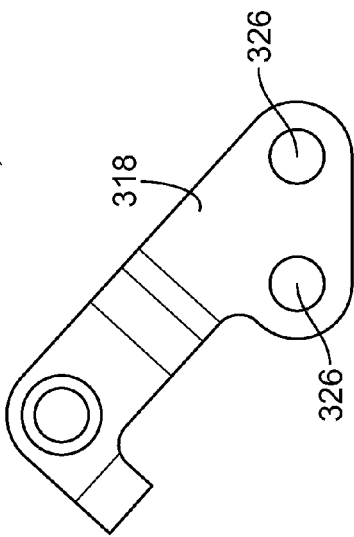
Figure 20A:
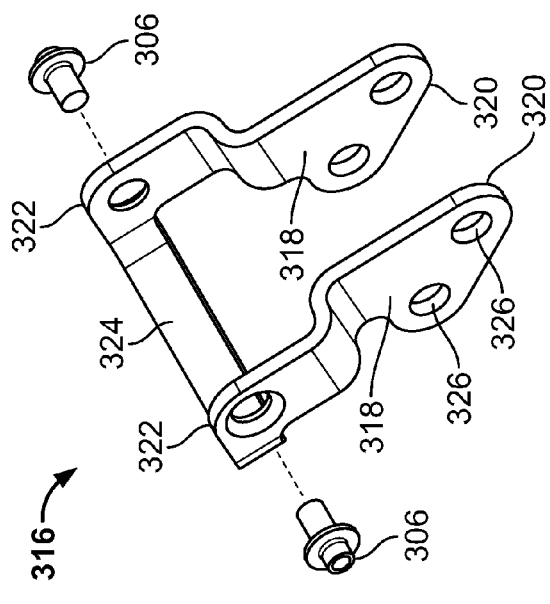
Figure 20C:
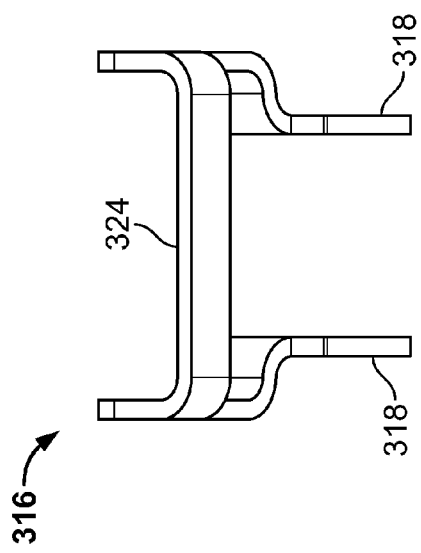

Referring to FIGS. 15A and 15B, in an embodiment, the side plates 216 includes a first end 238 and a second end 240 opposite the first end 238. In an embodiment, the first end 238 is offset obliquely from the second end 240. In an embodiment, each of the side plates 216 includes a first plurality of apertures 242 located proximate to the first end 238 each being sized and shaped to receive a rivet 244 for attachment to the mounting block 234 of the guide block 212 (see FIGS. 12 and 13), and a second plurality of apertures 246 formed proximate to the second end 240, one of which is sized and shaped to receive a handle pivot pin 248 for attachment to the handle 214, and the other of which is sized and shaped to receive a bushing 250 (see FIGS. 12 and 13).

Referring to FIGS. 16A through 16D in an embodiment, the handle 214 is constructed and has features similar to the handle 14 of the pin latch 10 as shown in FIGS. 6A through 6D and described above. Accordingly, a complete detailed description of the handle 214 is not being presented herein for the sake of brevity. Referring to FIGS. 17A through 17D, in an embodiment, a trigger 270 of the pin latch 210 in constructed and has features similar to the trigger 70 of the pin latch 10 as shown in FIGS. 7A through 7D and described above. Accordingly, a complete detailed description of the trigger 270 is not being presented herein for the sake of brevity.

Referring to FIGS. 18A through 18D, in an embodiment, the pin latch 210 includes an elongated link 286 having a first end 288 and a rounded second end 290 opposite the first end 288, and is constructed and shaped similar to the link 86 of the pin latch 10 shown in FIGS. 8A through 8D and as described above. Referring to FIGS. 19A through 19D, in an embodiment, the pin latch 210 includes a shear pin 292. In an embodiment, the shear pin 292 is constructed and has features similar to the shear pin 92 of the pin latch 10 as shown in FIGS. 9A through 9D and described above, except that the shear pin 292 includes additional opposed end holes 309 located proximate to a second end 296 thereof and next to end holes 308. In an embodiment, the shear pin 292 is received slidably within the tubular portion 222 and through the aperture 226 of the guide block 212 (see FIGS. 12 through 13). In an embodiment, the first end 288 of the link 286 is attached to the handle 214 within a central slot 284 thereof (see FIGS. 16B AND 16C), and the second end 290 of the link 286 extends through the slot 232 of the guide block 212 and the slot 299 of the shear pin 292 and is attached pivotally to the shear pin 292 proximate to a second end 296 thereof by a pin 302 (see FIGS. 21A and 21B).

Referring to FIGS. 20A through 20D, in an embodiment, the pin latch 210 includes a bracket 316 having a pair of arms 318 each having a first end 320 and a second end 322 and a cross bar 324 connecting the second ends 322. The first ends 320 of the arms 318 of the bracket 316 have apertures 326, and are sized and shaped to receive guide pins 328 (see FIGS. 12 and 13) for attachment to the shear pin 292 through the end holes 308, 309 thereof and to the guide block 212 through the slots 228 thereof, and enables the bracket 316 to slide and pivot relative to the guide block 212 when the shear pin 292 is moved. In an embodiment, two catch pins 306 are riveted into the second ends 322 of the bracket 316 (see FIG. 20A).

In an embodiment, the guide block 212, the handle 214, and the side plates 216 are fabricated from stainless steel, but other suitable materials can be used. In an embodiment, all other structural elements depicted in the Figures may also be fabricated from suitable grade stainless steel or other suitable metals, alloy metals, plastics, and/or other materials known in the art.

Figure 21A:
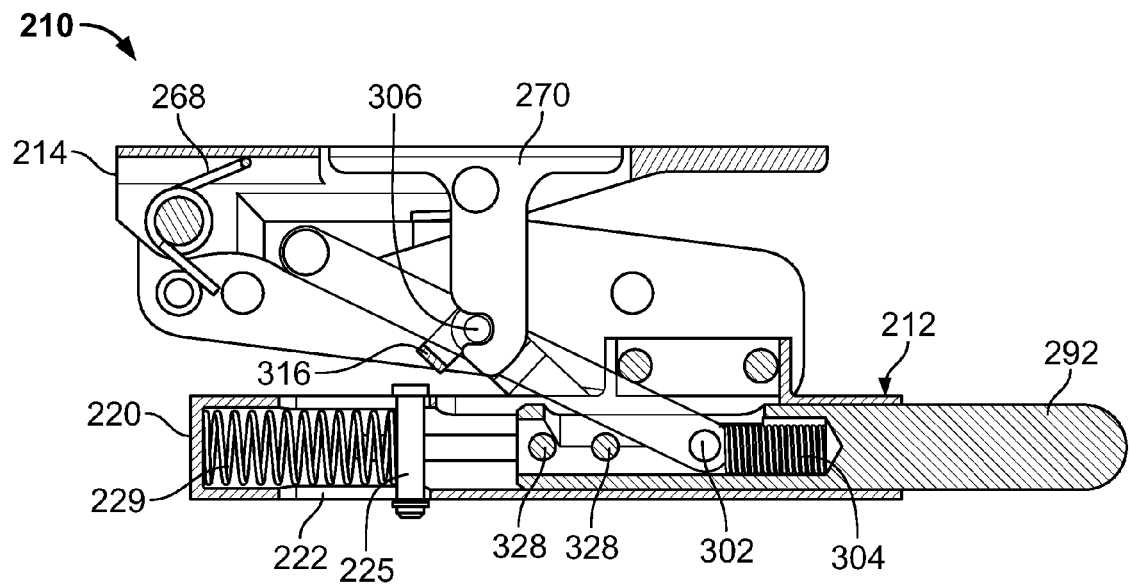
FIG. 21A is a side elevational view of the pin latch shown in FIG. 12, with portions thereof shown broken away and cross-sectioned for the purposes of clarity, but shown in a closed position, with a shear pin employed by the latch fully extracted and a trigger catching a trigger pin.
Figure 21B:
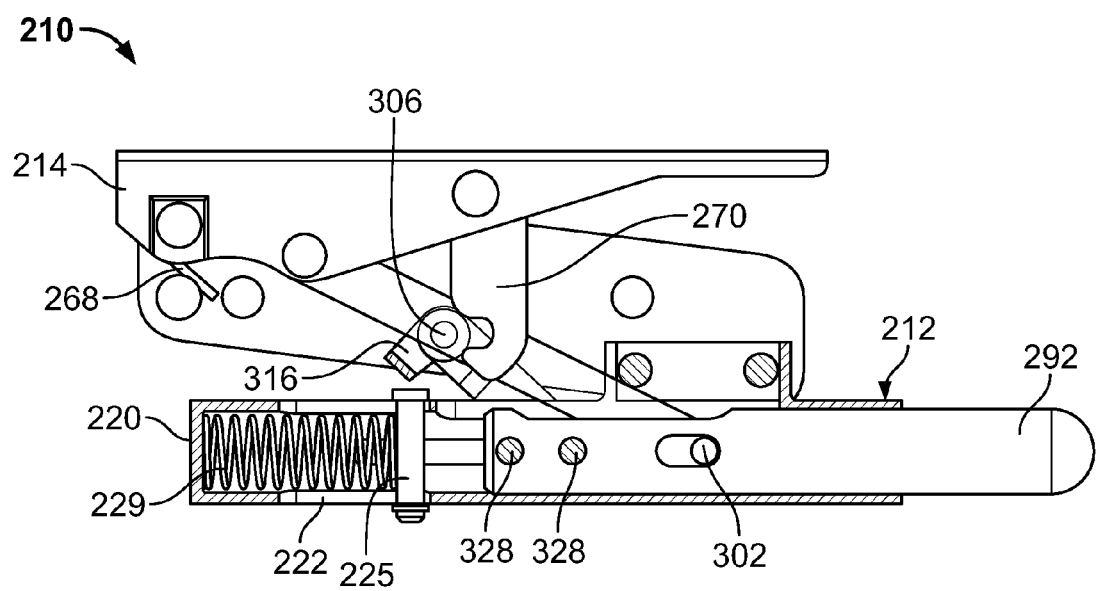
FIG. 21B is a side elevational view of the pin latch shown in FIG. 12, with portions thereof shown cross-sectioned, and shown in a closed position, with the shear pin retracted and the catch pin clearing the trigger.
Figure 22:
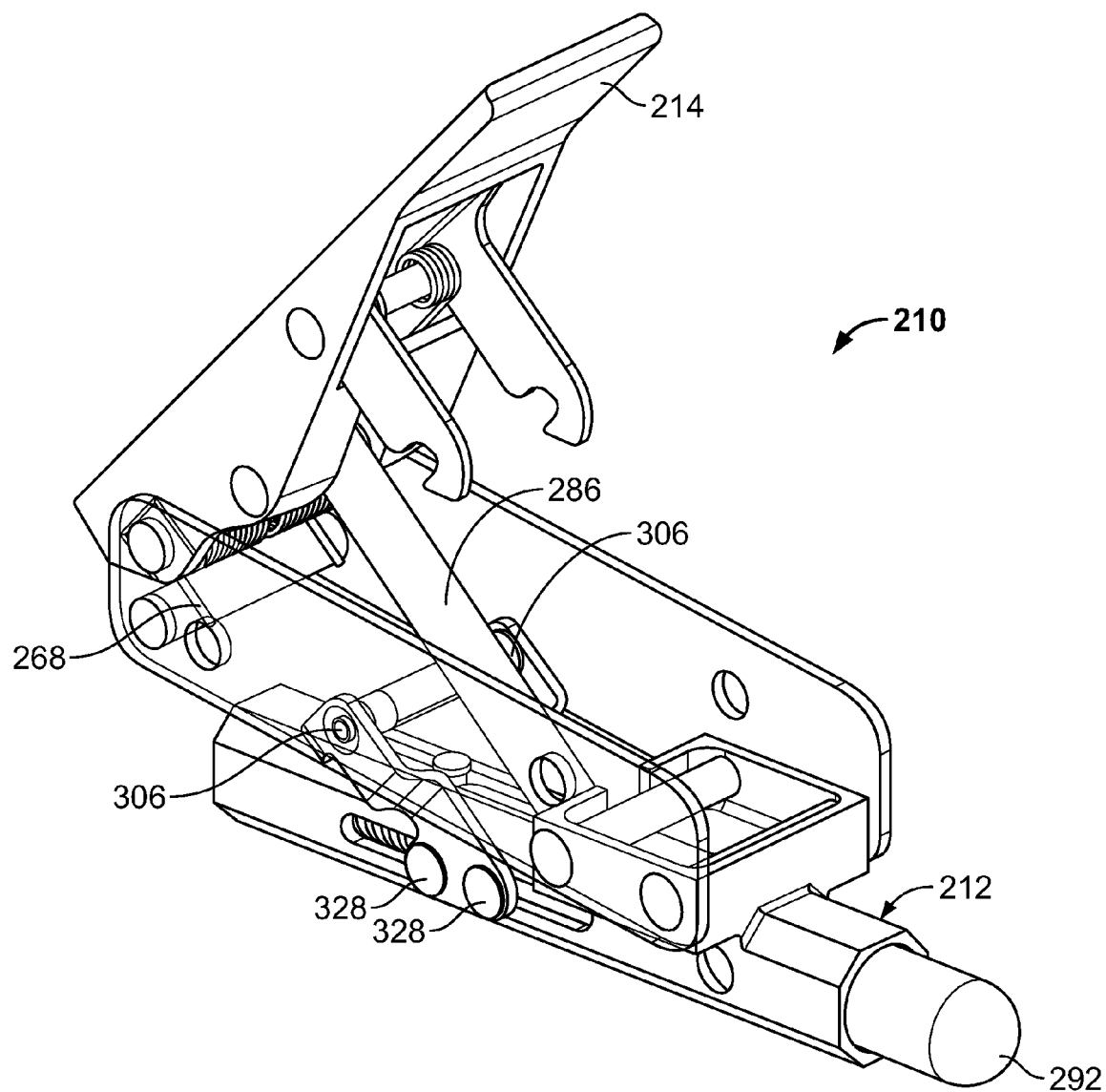
FIGS. 22 and 23 are a top perspective view and a side elevational cross-sectional view, respectively, of the pin latch shown in FIG. 12, with the pin latch being shown in an intermediate position.
Figure 23:
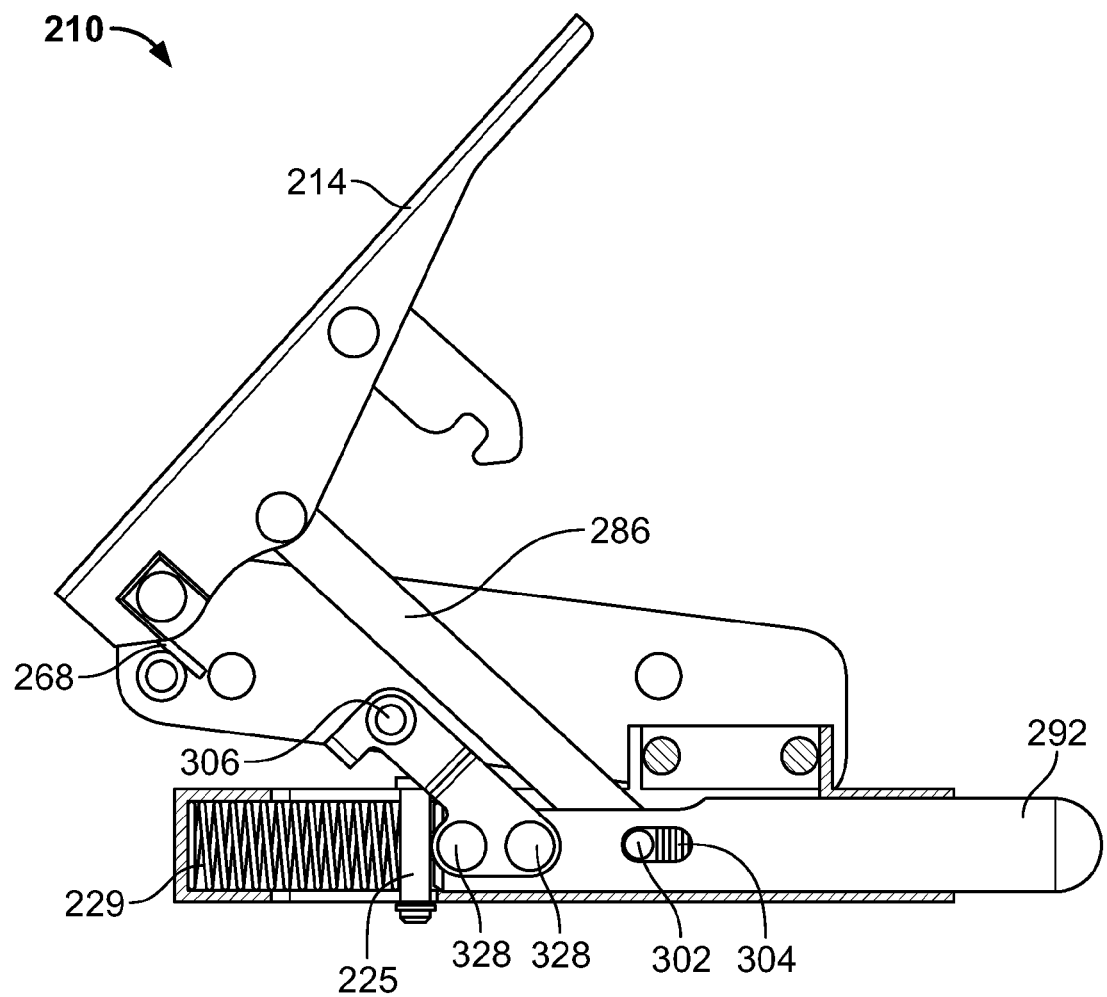

Referring to FIG. 21A, the pin latch 210 is shown in its closed position. In an embodiment, as shown in FIG. 21B, the pin latch 210 is opened by pressing the trigger 270 to disengage it from the catch pins 306 of the bracket 316, freeing the handle 214 to rotate outwardly via a back spring 268 until the shear pin 292 engages the stop pin 225 (see FIGS. 22 and 23). In this regard, the handle 214 cannot rotate further since the force of the back spring 268 is weaker than the force of the guide block spring 229. Thus, the handle 214 stops in its intermediate position as shown in FIGS. 22 and 23.

Figure 24:
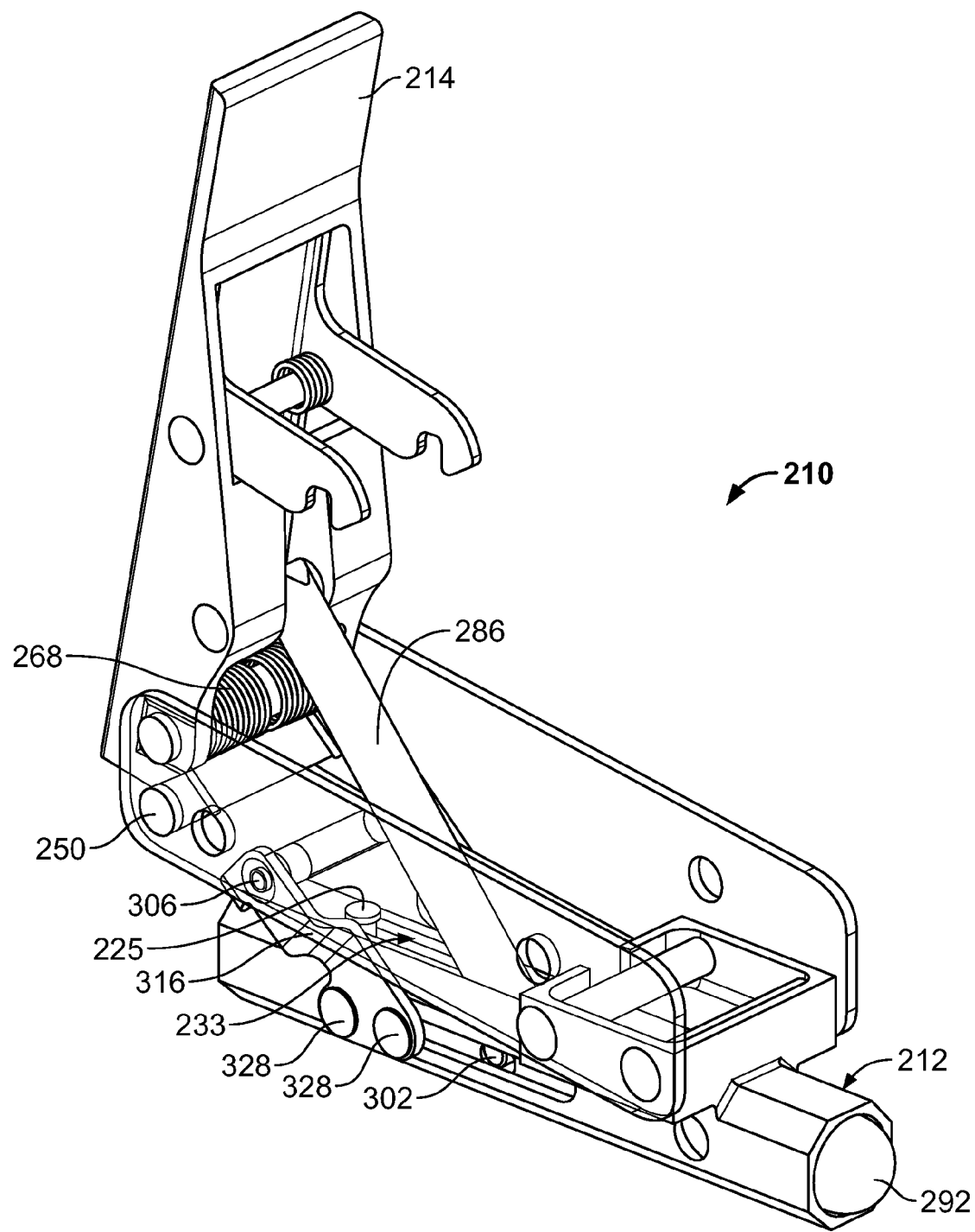
FIGS. 24 and 25 are a top perspective view and a side elevational cross-sectional view, respectively, of the pin latch shown in FIGS. 22 and 23, with the pin latch being shown in an open position.
Figure 25:
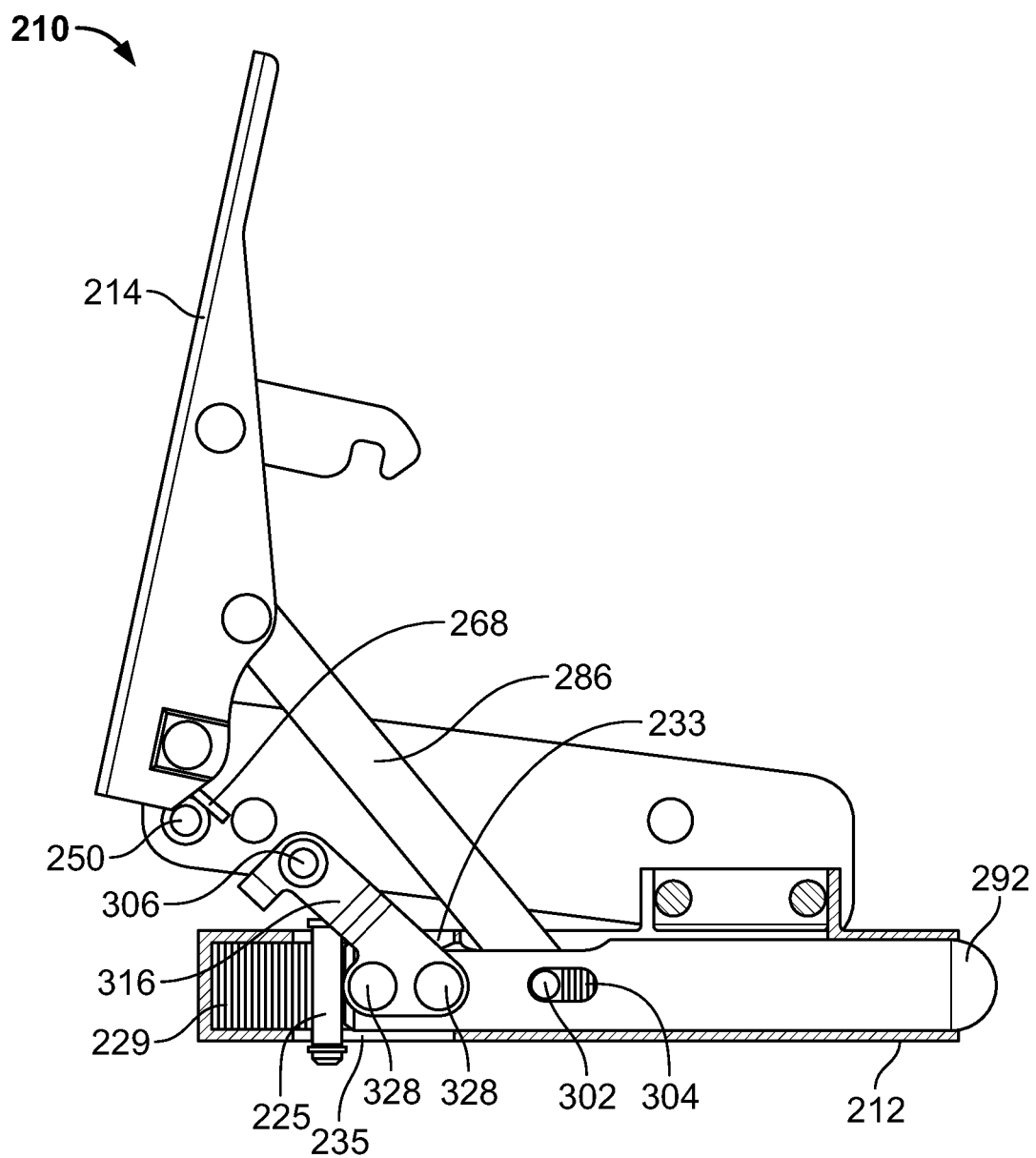
Figure 26:
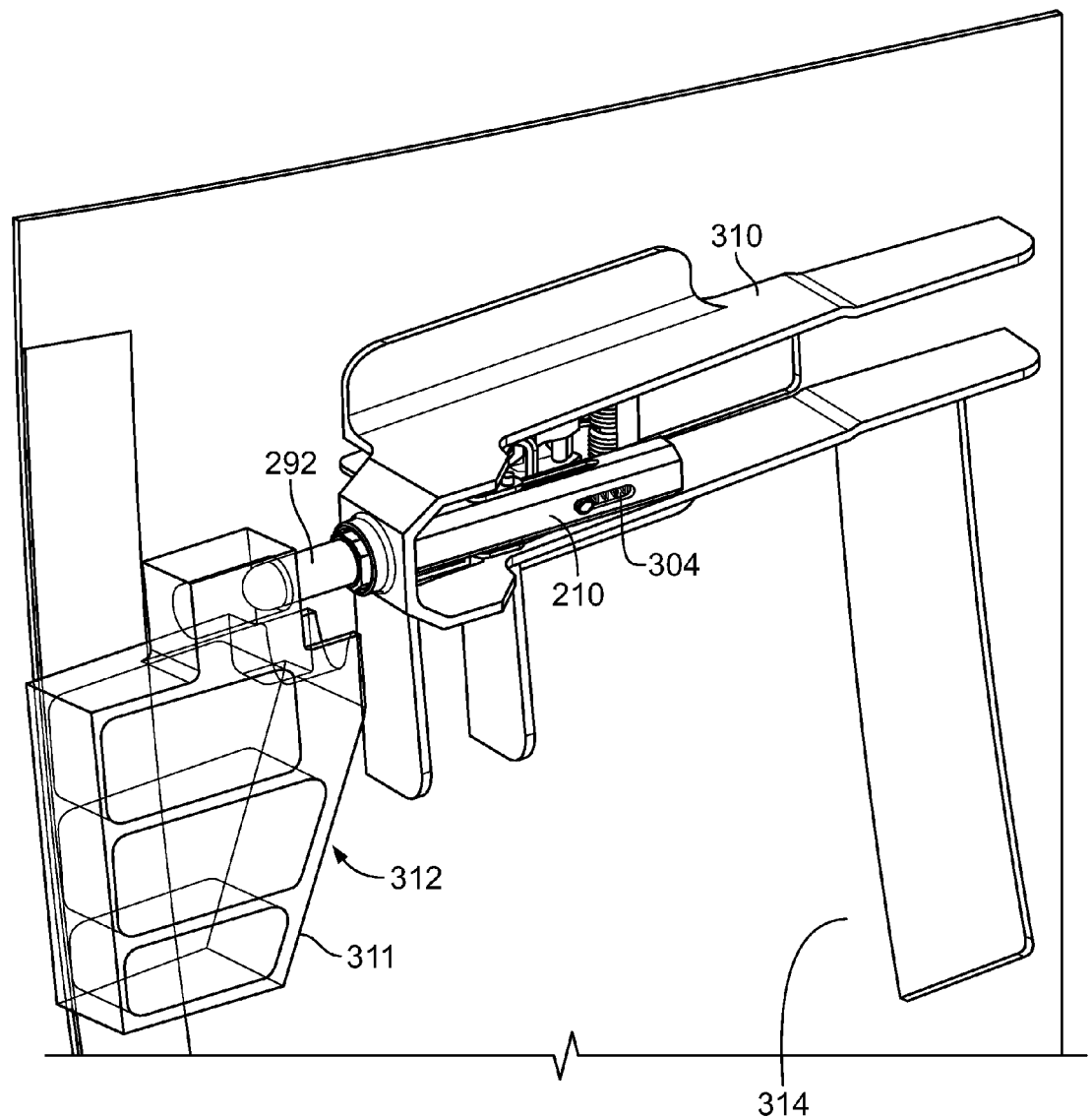
FIG. 26 illustrates the pin latch shown in FIG. 12 installed within a latch fitting and on a fan cowl door.

In an embodiment, the handle 214 can be rotated further and held in its open position (as shown in FIGS. 24 and 25) from its intermediate position in order to retract the shear pin 292 completely. In this regard, the shear pin 292 pushes the stop pin 225 until the handle 214 engages the bushing 250 and stops. Once the handle 214 is released from its open position, the shear-pin 292 is extracted automatically by the guide block spring 229 until the stop-pin 225 stops against the ends of the slots 233, 235 of the guide-block 212. Thus, the handle 214 stops and is positioned back to its intermediate position as shown in FIGS. 22 and 23.

To close the pin-latch 210 from its intermediate position, the handle 214 is rotated toward its closed position. In an embodiment, the handle 214 pushes the link 286 to extract the shear pin 292, thus, pivoting the bracket 316 and moving the two catch pins 306 thereof in the direction toward the shear pin 292. In an embodiment, if the shear pin 292 interferes with a keeper 312 of a fan cowl door 314 (shown in FIG. 26), then the two catch pins 306 will never reach a waiting position for the trigger 270 to be able to catch the two catch pins 306. In this regard, the handle 214 then automatically rotates back to its intermediate position via the back spring 268 and it signals an unlatching condition once the handle 214 is released.

During the fan cowl door 314 closing operation with the pin latch 210 latched, the end 294 of the shear pin 292 engages and glides on a ramp 311 of the keeper 312. In this regard, the keeper 312 pushes the shear pin 292 against a shear pin spring 304 (see FIG. 21A) until the two catch pins 306 disengage the trigger 270 and allow the handle 214 to automatically rotate to its intermediate position via the back spring 268. The pin-latch 210 then can be re-closed once the shear pin 292 moves and fully extracts in the keeper's 312 cavity.

As disclosed above, if when closing the pin latch 210 from its intermediate position, with the handle 214 rotated toward its closed position, should the shear pin 292 interfere with the keeper 312 of the fan cowl door 314, then the two catch pins 306 will never reach a waiting position for the trigger 270 to be able to catch the two catch pins 306. This condition can occur when a misalignment exists between the keeper 312 and the pin latch 210. To prevent this from occurring, a device that detects such a non-ready or misaligned condition before the shear pin 292 contacts the keeper 312, and simultaneously blocks the further extraction of the shear pin 292, is employed in an embodiment which follows.

FIGS. 27 through 37 show an embodiment of a pin latch 510. Elements illustrated in FIGS. 27 through 37 which correspond, either identically or substantially, to the elements described above with respect to the embodiment shown in FIGS. 12 through 26 have been designated by corresponding reference numerals increased by three hundred, respectively. Unless otherwise stated, the embodiment shown in FIGS. 27 through 37 is constructed, assembled, and operated in the same or a similar manner as the embodiment shown in FIGS. 12 through 26.

Figure 27:
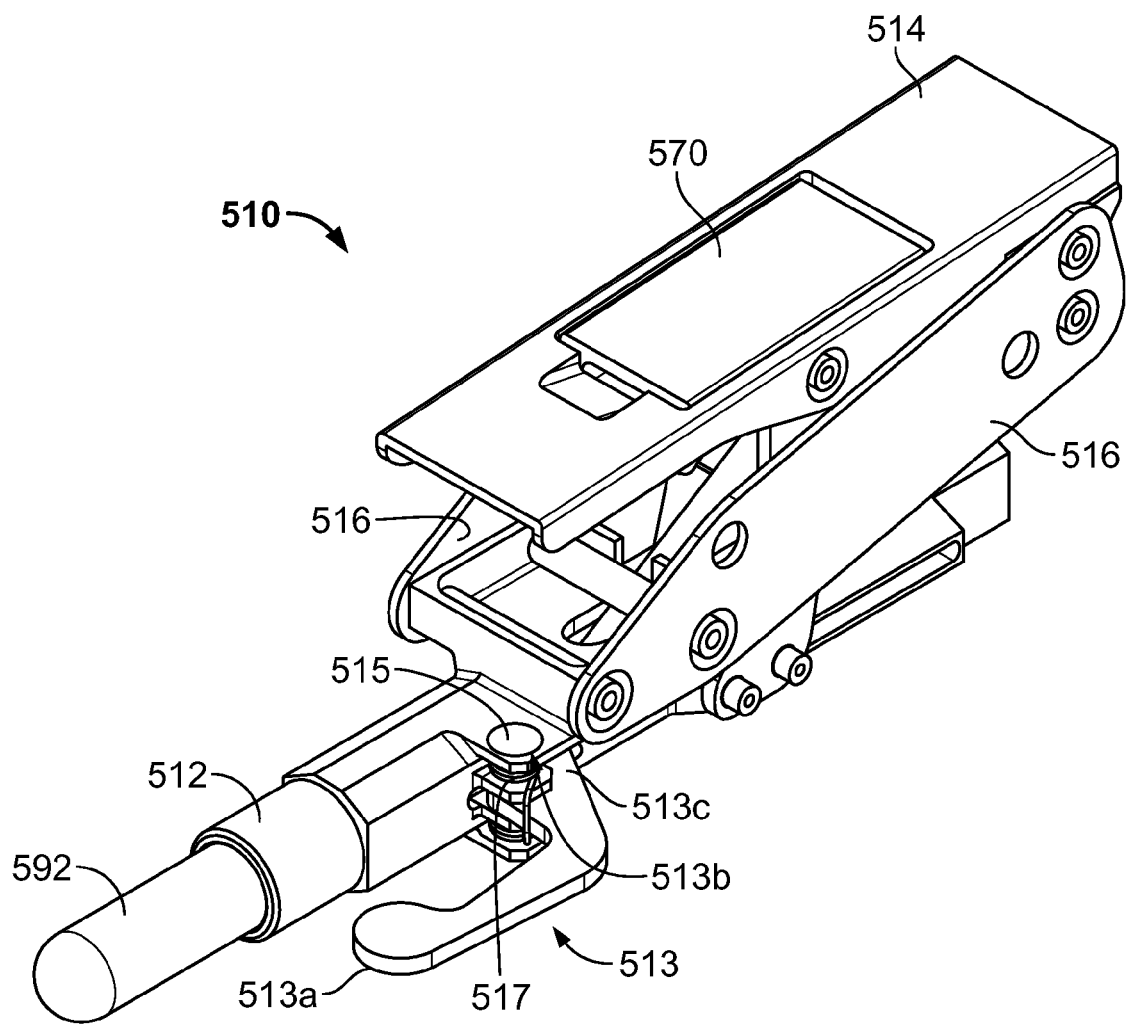
FIG. 27 is a top perspective view of a pin latch constructed in accordance with another embodiment of the present invention, the pin latch being shown in a closed position.
Figure 28:
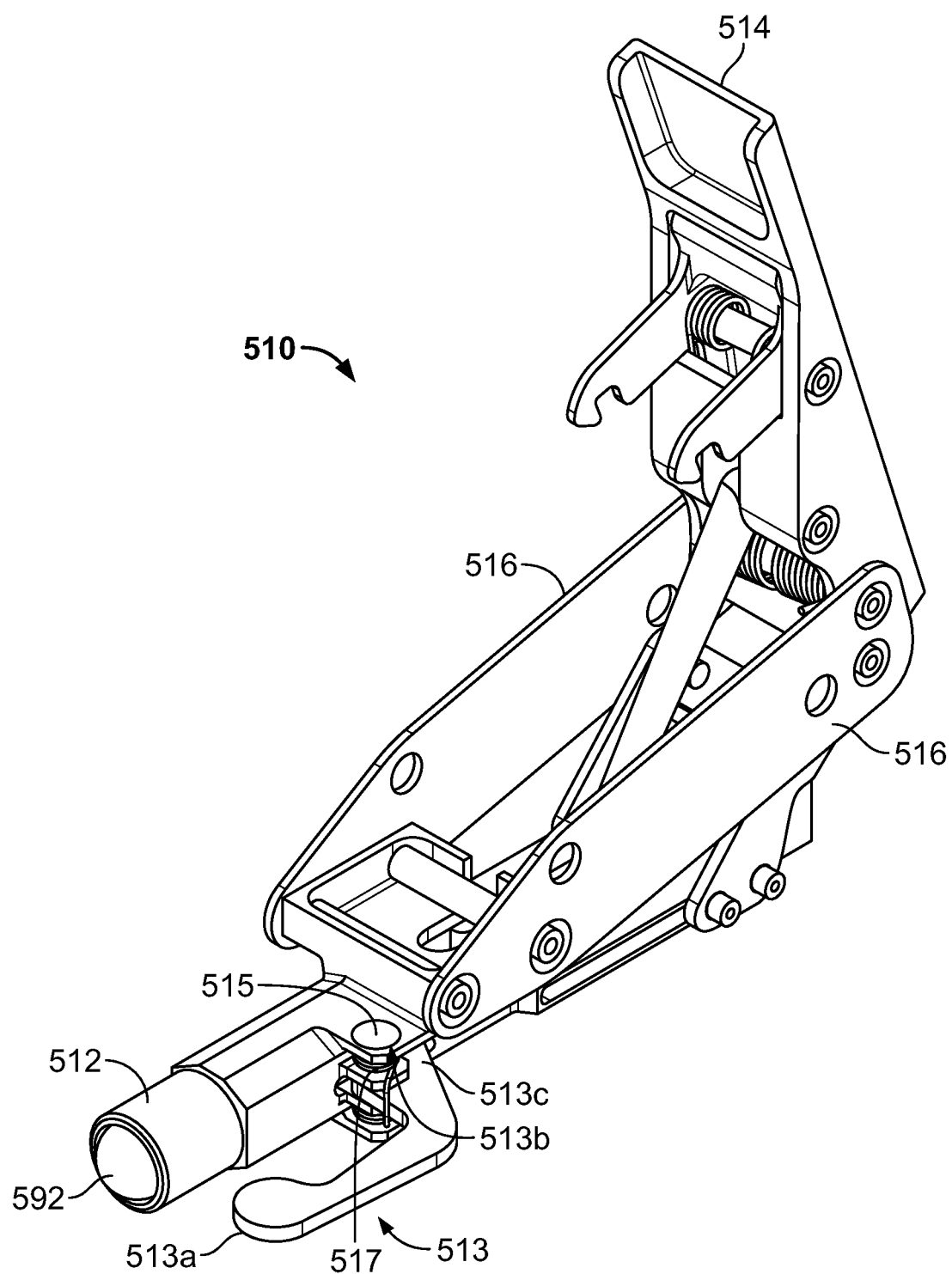
FIG. 28 is top perspective view of the pin latch shown in FIG. 27, the pin latch being shown in an open position.
Figure 29:
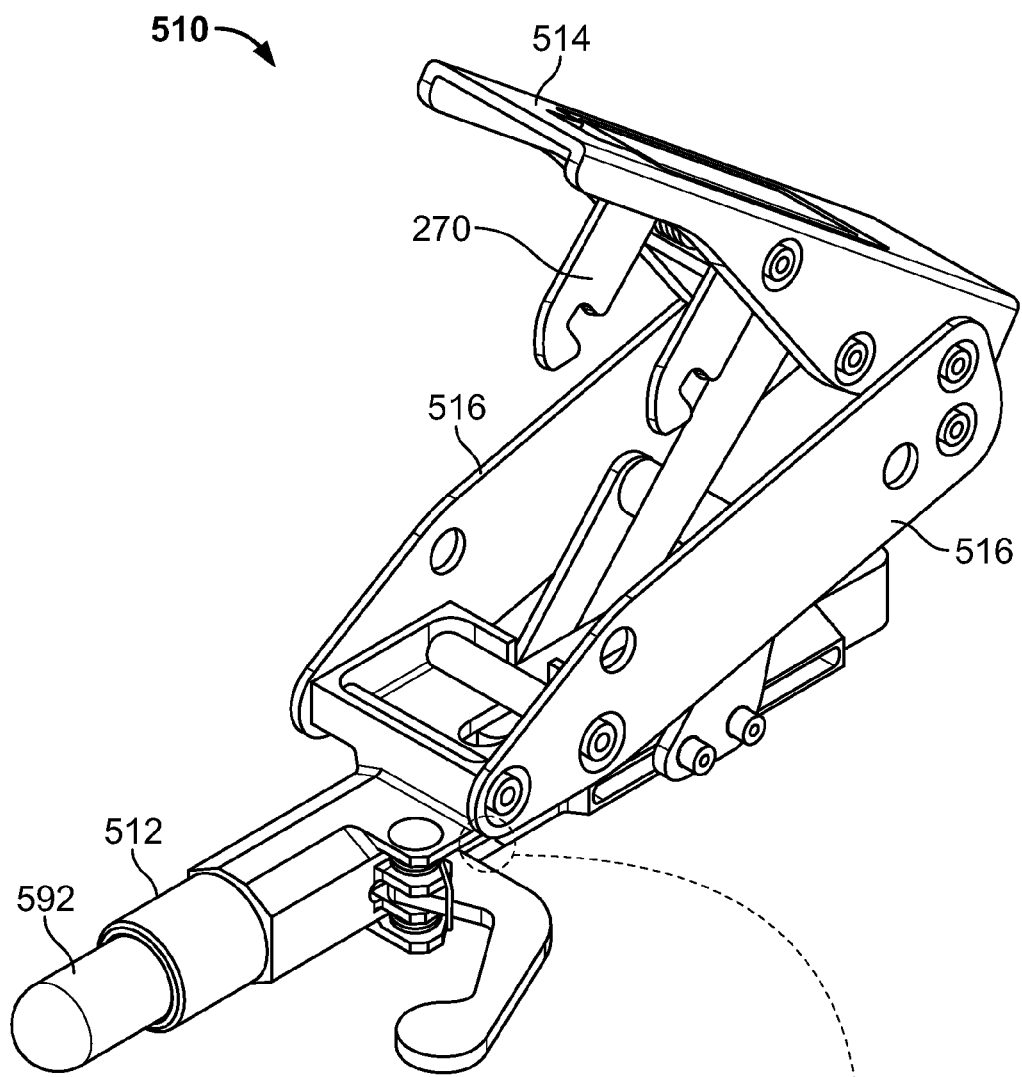
FIG. 29 is a top perspective view of the pin latch shown in FIG. 27, the pin latch being shown in an intermediate position with the shear pin partially extracted.

Referring to FIGS. 27 through 29, in an embodiment, the pin latch 510 includes a guide block 512 with an L-shaped finger 513 rotatably attached thereto by a rivet 515. In an embodiment, the finger 513 includes a tip 513a, a pivot hole 513b, and a follower-end 513c. In an embodiment, the rivet 515 protrudes through the pivot hole 513b, and a coil finger spring 517 is positioned around the rivet 515 for the purpose of biasing the finger 513 in a manner disclosed hereinbelow. In an embodiment, the pin latch 510 includes a handle 514, and a pair of side plates 516 that connect the guide block 512 and the handle 514 to one another. In an embodiment, one of the side plates 516 is attached to one side of the guide block 512 and the other of the side plates 516 is attached to an opposite side of the guide block 512. In an embodiment, the handle 514 is connected pivotally to the side plates 516 and pivots relative to the guide block 512 between a closed position (see FIG. 27), in which the handle 514 is releasably retained in and is juxtaposed to the guide block 512, and an open position (see FIG. 28). In an embodiment, a trigger 570 releases the handle 514 and is structured and functions similar to the trigger 270 described above. In an embodiment, the pin latch 510 includes a shear pin 592. In an embodiment, the shear pin 592 is constructed and has features similar to the shear pin 292 of the pin latch 210 as shown in FIGS. 12 through 26 and described above, except that the shear pin 592 includes an elongated groove 519 (see FIG. 30).

Figure 30:
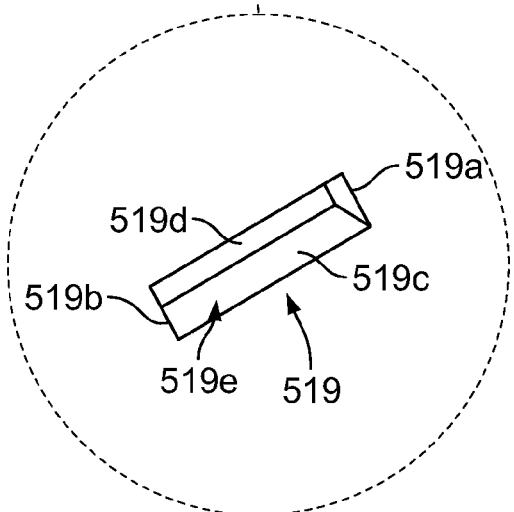
FIG. 30 is an enlarged view of Detail 30 of FIG. 29, showing a grooved portion of the shear pin.

In an embodiment, referring to FIG. 30, the groove 519 includes a first end 519a and a second end 519b which is opposite the first end 519a, and sides 519c and a bottom 519d. The groove 519 has a spatial void or recess 519e that is bounded by the opening of the groove 519, the first and second ends 519a, 519b, the sides 519c, and the bottom 519d.

Figure 31:
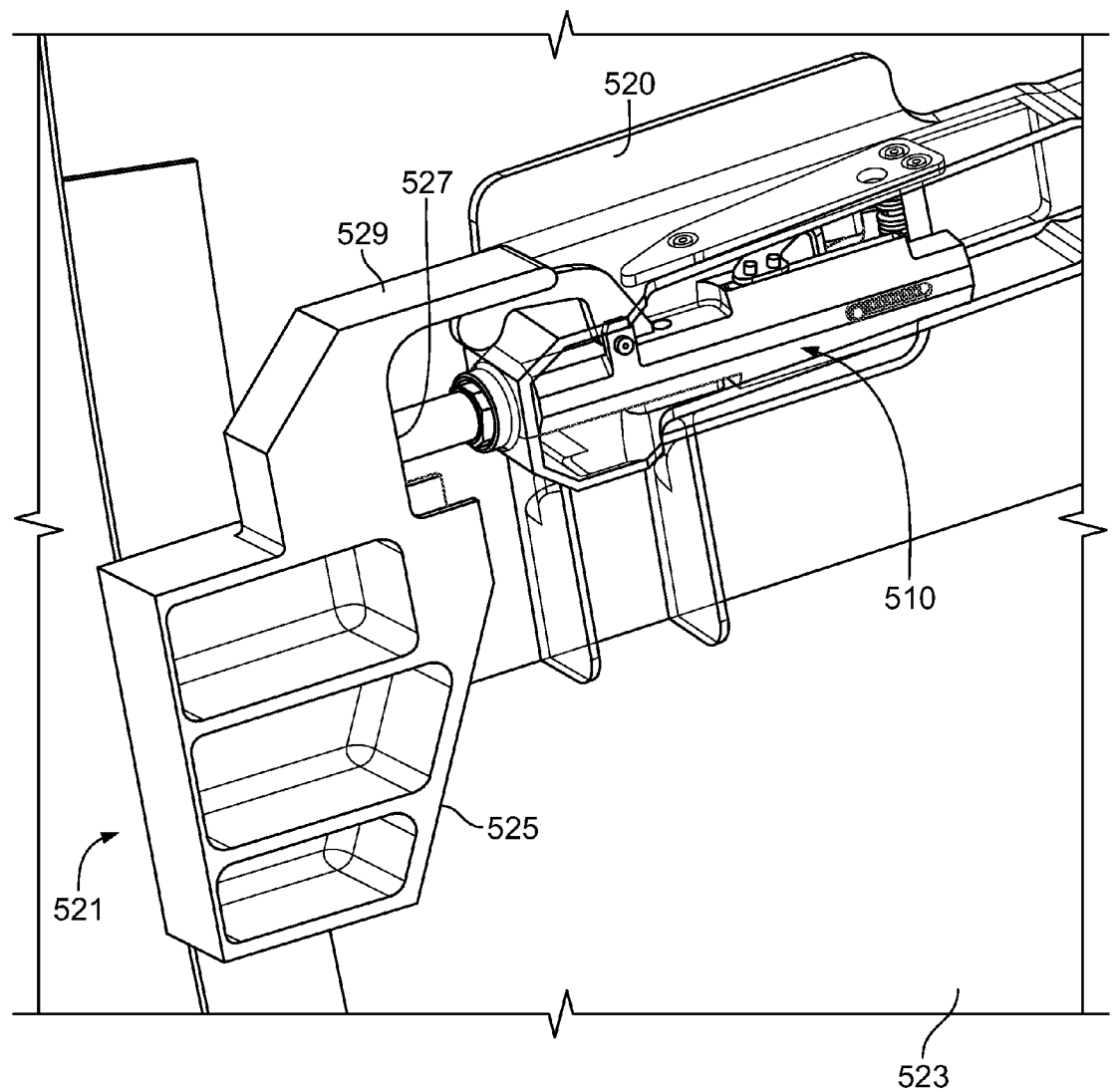
FIG. 31 illustrates the pin latch shown in FIG. 27 installed within a latch fitting and on a fan cowl door.
Figure 32:
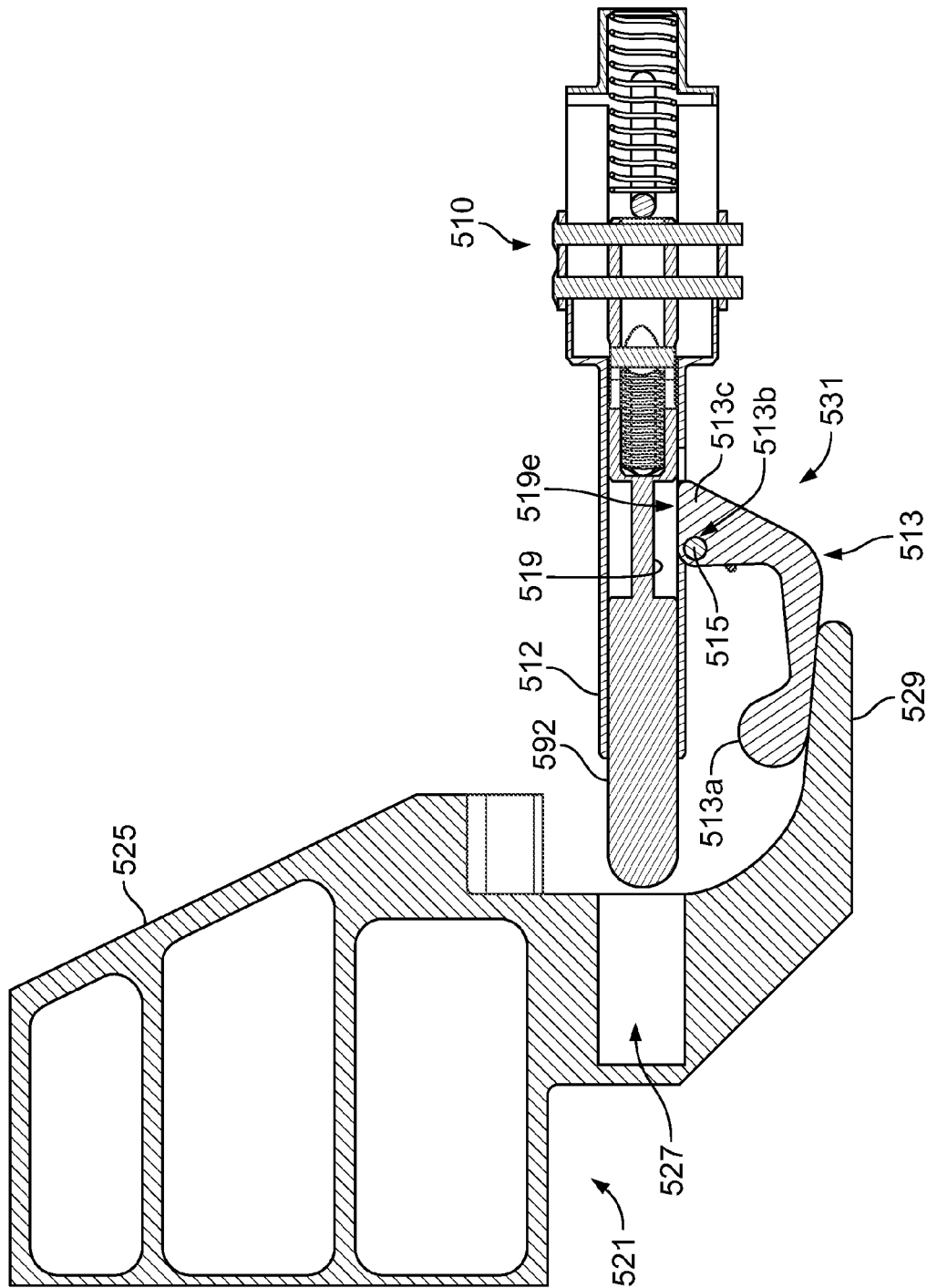
FIG. 32 is a cross sectional view of the pin latch shown in FIG. 27 which is aligned with the latch fitting.
Figure 33:
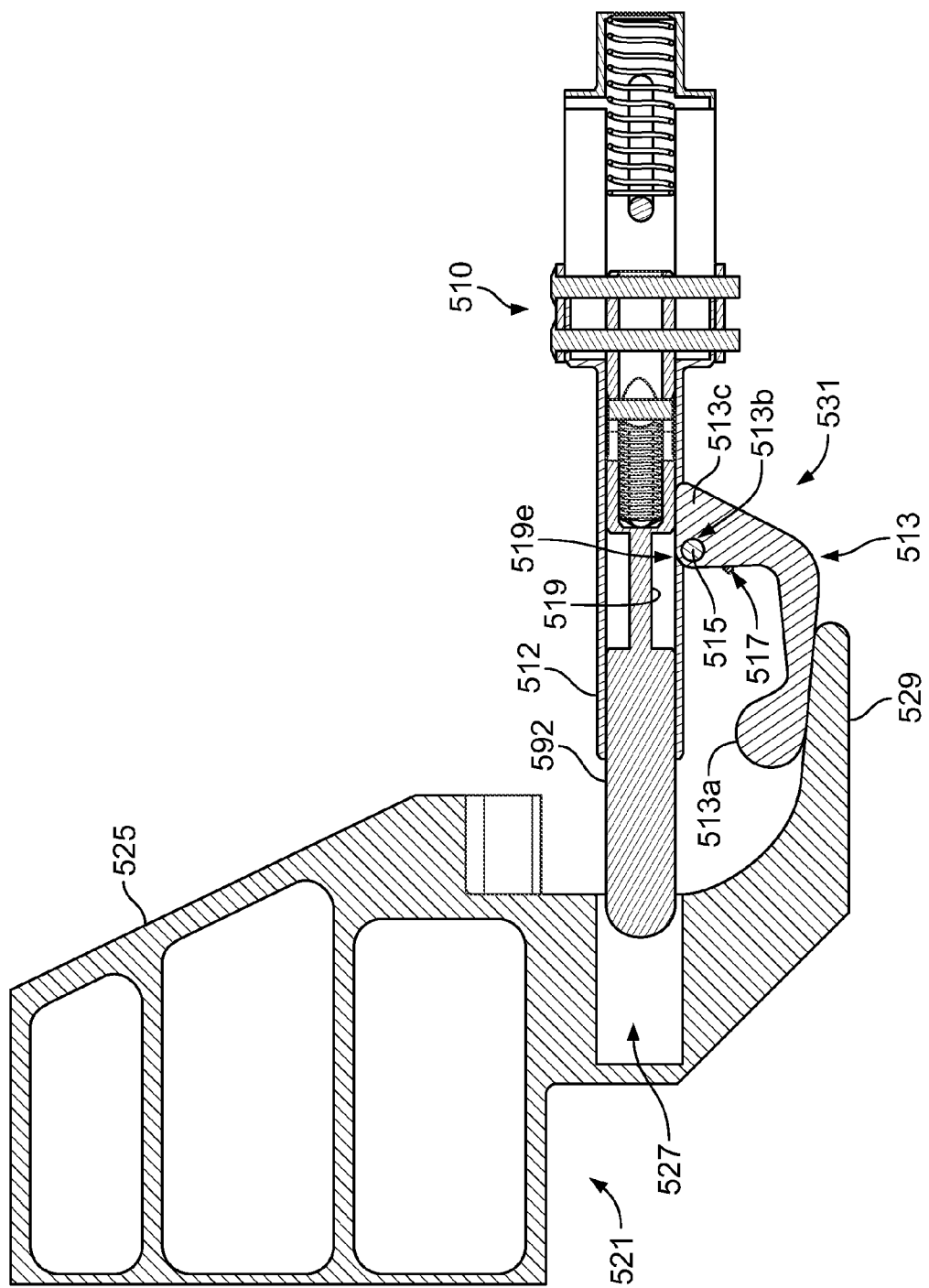
FIG. 33 is a cross sectional view of the pin latch shown in FIG. 27 installed within the latch fitting.
Figure 34:
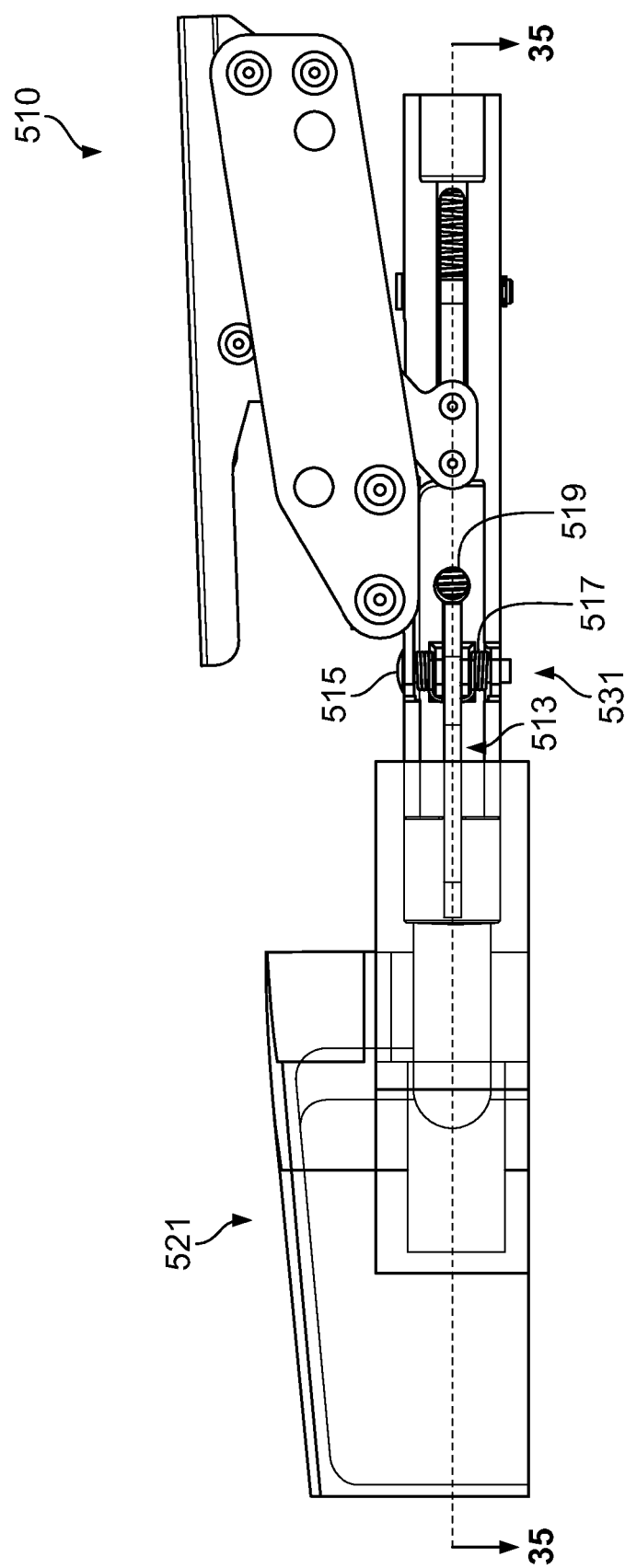
FIG. 34 is a side elevational view of the pin latch shown in FIG. 33 installed within the latch fitting.
Figure 35:
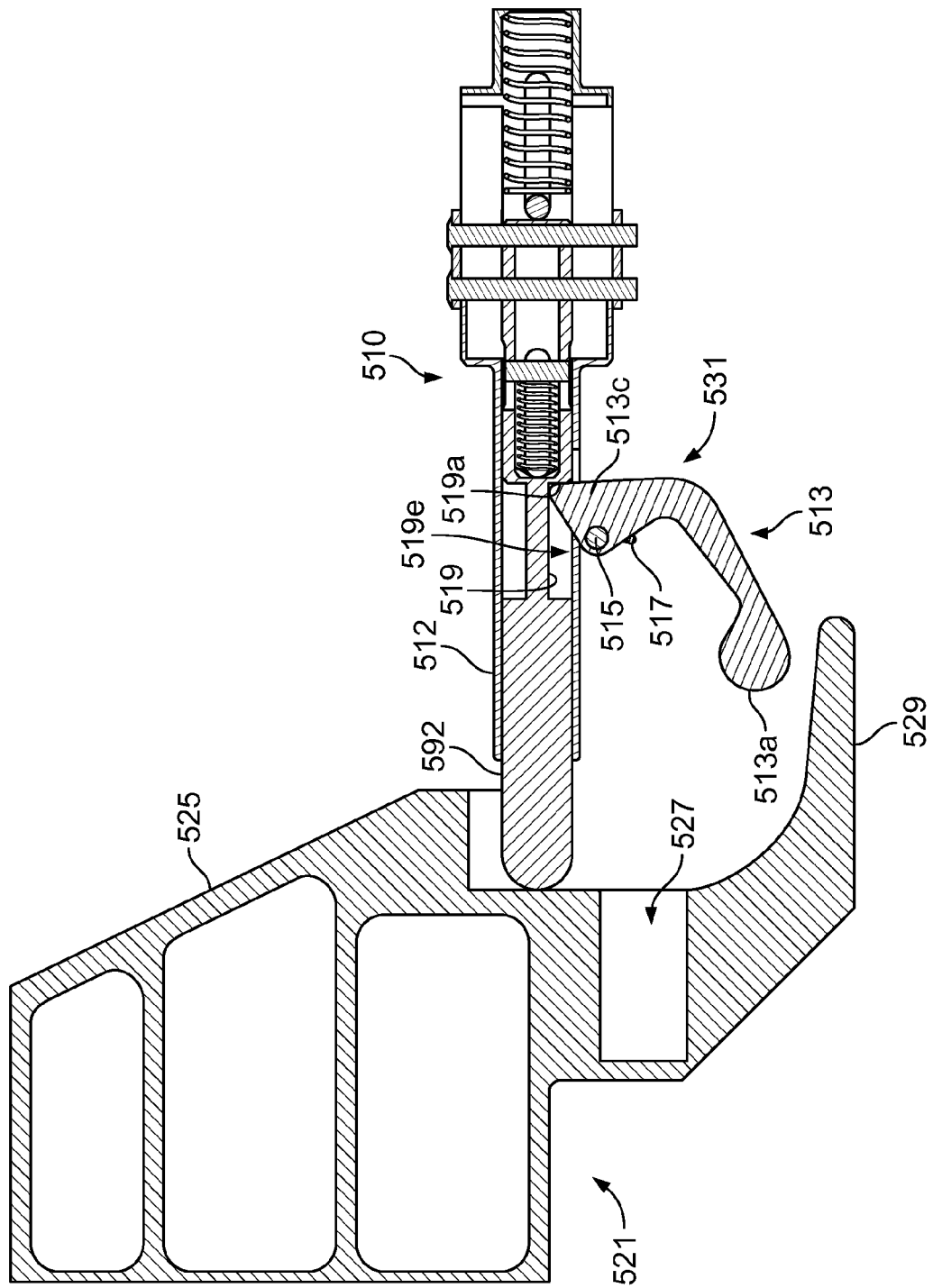
FIG. 35 is a cross-sectional view, taken along line 35-35 and looking in the direction of the arrows, of the pin latch shown in FIG. 34, the pin latch being misaligned with the latch fitting and the finger detector blocking extraction of the shear pin.

Referring to FIG. 31, in an embodiment, the pin latch 510 is installed within a latch fitting 520 on a fan cowl door 523. In an embodiment, a keeper 521 is positioned on the fan cowl door 523. In an embodiment, the keeper 521 has a guide 525, a cavity 527 (see FIG. 32), and a ram 529. In an embodiment, the ram 529 interacts with a detection and blocking device (hereinafter "the device 531") of the pin latch 510 to detect a ready condition (i.e., a latchable position) (see FIGS. 32 through 34), or a non-ready condition (i.e., a non-latchable position) (see FIG. 35). In an embodiment, a non-ready condition is a condition in which the closing of the pin latch 510 will result in the pin latch 510 interfering with the keeper 521 rather than latching on the keeper 521.

In an embodiment, the device 531 comprises the finger 513, the rivet 515, the spring 517, and the groove 519. In an embodiment, when the device 531 detects a non-ready condition, the device 531 blocks further extraction of the shear pin 592 in a blocking mode of operation, which is described below. In an embodiment, the modes of operation of the device 531 (including the blocking mode) are described below in relationship to the positions of the pin latch 510. In an embodiment, in operation and with reference to FIGS. 35 though 36, the finger 513 pivots about the rivet 515. In an embodiment, like a lever, the follower-end 513c of the finger 513 is biased by the coil finger spring 517 to pivot into the recess 519e of the groove 519 when the recess 519e is adjacent to the follower-end 513c.

Intermediate Position: Aligned and Ready

Figure 37:
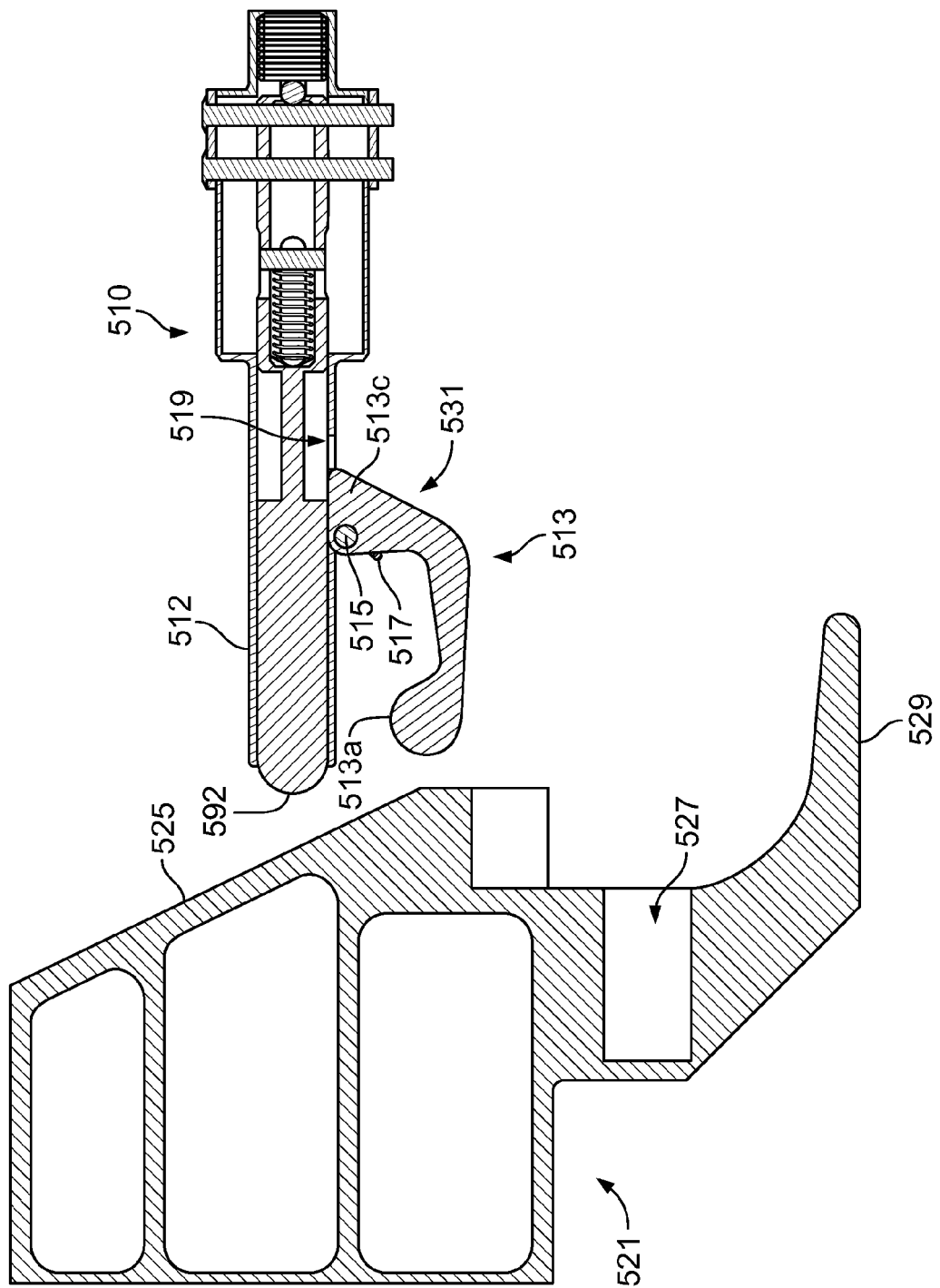
FIG. 37 a cross sectional top view of the pin latch shown in FIG. 28, the pin latch being positioned adjacent to the latch fitting with the shear pin retracted.

In an embodiment, as described above in relation to the pin latches 10, 210, the pin latch 510 automatically moves to the intermediate position when the trigger 570 is pressed and the handle 514 is moved from the closed position (see FIGS. 33 and 34) or when the handle 514 is released from the open position (see FIG. 37). More particularly, in an embodiment, when moving from the open position to the intermediate position (see FIG. 32), the shear pin 592 extracts and the recess 519e of the groove 519 is positioned adjacent to the follower-end 513c of the finger 513. Because the tip 513a of the finger 513 contacts the ram 529, the ram 529 prevents the finger spring 517 from rotating the follower-end 513c of the finger 513 in the recess 519e, and therefore the follower-end 513c remains clear of the recess 519e of the groove 519 (see FIG. 32). In an embodiment, as the handle 514 is further rotated to the closed position, the shear pin 592 extracts and is positioned in the cavity 527 of the keeper 521 and the pin latch 510 is latched (see FIGS. 33 and 34).

Intermediate Position: Misaligned and Not-Ready

In an embodiment, when moving from the open position (see FIG. 37) to the intermediate position (see FIG. 35), the shear pin 592 extracts and the recess 519e of the groove 519 is positioned adjacent to the follower-end 513c of the finger 513. In an embodiment, because the tip 513a of the finger 513 does not contact the ram 529, the finger spring 517 rotates the follower-end 513c of the finger 513 in the recess 519e.

Blocked Position

Figure 36:
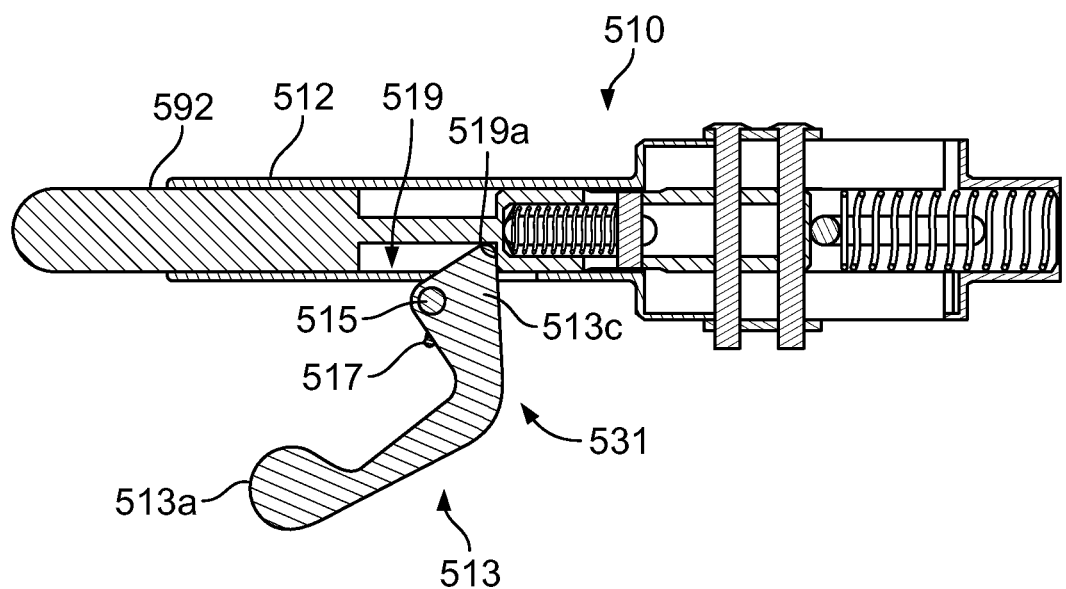
FIG. 36 is a cross sectional top view of the pin latch shown in FIG. 29.

In an embodiment, as the handle 514 is further rotated towards the closed position, the pin latch 510 is in the blocked position (see FIG. 36). More particularly, in an embodiment, in the blocked position, the follower-end 513c of the finger 513 contacts the first end 519a of the groove 519 and prevents the shear pin 592 from further extracting and the handle 514 from further rotating to the closed position. In an embodiment, the blocked position, therefore, prevents the shear pin 592 from interfering with the keeper 521, and alerts the user to the misalignment because the user is blocked from rotating the handle 514 from the intermediate position to the closed position.

It will be understood that the embodiments described herein are merely exemplary and that a person skilled in the art may make many variations and modifications without departing from the spirit and scope of the invention. For instance, in an embodiment, the pin latches 10, 210, and 510 may be used for doors and access panels for aircraft, such as fan cowls, fuselages, nacelles, engine cowlings, radomes, etc. In other embodiments, the pin latches 10, 210 and 510 can be used in other suitable environments and for other vehicles and structures. In other embodiments, the pin latches 10, 210 and 510 can be configured as a pin latch or other suitable latch, such as a hook latch. All such variations and modifications are intended to be included within the scope of the invention as defined in the appended claims.

What is claimed is:

1. A pin latch, comprising:
   a guide block having a first end, a second end opposite the first end, and a tubular portion extending from the first end to the second end and having a pair of opposed sidewalls, each of which includes a slot extending proximate from the second end to a point intermediate the first and second ends, the tubular portion further including a top wall extending between the pair of opposed sidewalls and having a top slot extending from the second end to a point intermediate the first and second ends;
   a handle attached pivotally to the guide block, the handle including a trigger;
   a shear pin housed slidably within the tubular portion of the guide block and connected to the handle, the shear pin including a catch-pin that is slidable between an engageable position and a disengageable position, a first end, a second end opposite the first end of the shear pin, an interior portion extending from the second end of the shear pin to a point intermediate the first and second ends of the shear pin, a top slot in communication with the interior portion, a pair of opposed elongated slots, and a connecting pin housed within the pair of opposed elongated slots, and the catch-pin of the shear pin being positioned slidably and guided within the slots of the pair of opposed sidewalls of the tubular portion of the guide block; and
   a link having a first end and a second end opposite the first end of the link, the first end of the link being attached pivotally to the handle and the second end of the link being attached pivotally to the shear pin proximate to the second end thereof by the connecting pin, and the second end of the link extending through the top slot of the too wall of the tubular portion of the guide block and the top slot of the shear pin,
   wherein the handle is moveable between a closed position, in which the handle is retained releasably within the guide block, the shear pin is extended from the guide block, and the trigger is engaged with the catch-pin of the shear pin when the catch-pin is in its engageable position, and an open position, in which the handle is retracted from the guide block, the trigger is disengaged from the catch-pin, and the shear pin is retracted within the guide block and the catch-pin is moved to its disengageable position.

2. The pin latch of claim 1, wherein the tubular portion of the guide block includes an aperture formed within a first end of the tubular portion, and wherein the shear pin is sized and shaped to slide through the aperture.

3. The pin latch of claim 1, wherein the trigger includes a pair of detents each of which includes a slot that is sized and shaped to receive the catch-pin of the shear pin when the catch-pin is in its engageable position.

4. The pin latch of claim 3, wherein the handle includes a back spring, wherein the handle is moveable from its closed position to its open position when the trigger is depressed to release the detents of the trigger from the catch-pin of the shear pin, and wherein the handle is automatically moved to its open position via the back spring.

5. The pin latch of claim 4, wherein the trigger includes a trigger spring.

6. The pin latch of claim 4, further comprising a compression spring positioned within the interior portion of the shear pin and acting against the second end of the link, wherein when the handle is in its closed position, the shear pin is driven against and compresses the compression spring, and wherein when the handle is in its open position, the compression spring expands and acts against the second end of the link.

7. The pin latch of claim 6, further comprising at least one side plate that connects the guide block and the handle to one another, wherein the at least one side plate includes a first end connected to the guide block, and a second end opposite the first end of the at least one side plate, wherein the handle is connected pivotally to the second end of the at least one side plate.

8. The pin latch of claim 7, wherein the at least one side plate includes a pair of side plates, wherein one of the pair of side plates is attached to one side of the guide block, and the other of the pair of side plates is attached to an opposite side of the guide block.

9. The pin latch of claim 1, wherein the guide block includes a mounting block for mounting the pin latch to an external structure.

10. A pin latch, comprising:
    a guide block having a first end, a second end opposite the first end, and a tubular portion extending from the first end to the second end and having a pair of opposed sidewalls, each of which includes a slot extending proximate from the second end to a point intermediate the first and second ends, the tubular portion further including a top wall extending between the pair of opposed sidewalls and having a top slot extending from the second end to a point intermediate the first and second ends;
    a handle attached pivotally to the guide block, the handle including a back spring and a trigger having a pair of detents, each of which includes a slot;
    a shear pin housed slidably within the tubular portion of the guide block and connected to the handle, the shear pin including a catch-pin that is slidable between an engageable position and a disengageable position, a first end, a second end opposite the first end of the shear pin, an interior portion extending from the second end of the shear pin to a point intermediate the first and second ends of the shear pin, a top slot in communication with the interior portion, the catch-pin of the shear pin being positioned slidably and guided within the slots of the pair of opposed sidewalls of the tubular portion of the guide block, and each of the slots of the detents of the trigger of the handle being sized and shaped to receive the catch-pin of the shear pin when the catch-pin is in its engageable position;
    a link having a first end and a second end opposite the first end of the link, the first end of the link being attached pivotally to the handle and the second end of the link being attached to the shear pin, and the second end of the link extending through the top slot of the tubular portion of the guide block and the top slot of the shear pin; and
    a compression spring positioned within the interior portion of the shear pin and against the second end of the link,
    wherein the handle is moveable between a closed position, in which the handle is retained releasably within the guide block, the shear pin is extended from the guide block, and the trigger is engaged with the catch-pin of the shear pin when the catch-pin is in its engageable position, and an open position, in which the trigger is depressed and the detents of the trigger are disengaged from the catch-pin, the handle is retracted from the guide block, and the shear pin is retracted within the guide block, and the catch-pin is moved to its disengageable position, and the handle is automatically moved to its open position via the back spring, and wherein when the handle is in its closed position, the shear pin is driven against and compresses the compression spring, and wherein when the handle is in its open position, the compression spring expands and acts against the second end of the link.

* * * * *

UNITED STATES PATENT AND TRADEMARK OFFICE
CERTIFICATE OF CORRECTION

PATENT NO. : 9,523,221 B2
APPLICATION NO. : 14/461544
DATED : December 20, 2016
INVENTOR(S) : Thai Do Page 1 of 1

It is certified that error appears in the above-identified patent and that said Letters Patent is hereby corrected as shown below:

In the Specification

Column 3, Line 62, delete "FIG. 3 is" and insert --FIG. 3 is a--.

Column 5, Line 27, delete "FIG. 37 a" and insert --FIG. 37 is a--.

Column 6, Line 42, delete "In embodiment," and insert --In an embodiment--.

Column 9, Line 32, delete "210 in constructed" and insert --210 is constructed--.

Column 9, Line 55, delete "16B AND 16C" and insert --16B and 16C--.

Signed and Sealed this
Seventeenth Day of October, 2017

Joseph Matal
*Performing the Functions and Duties of the
Under Secretary of Commerce for Intellectual Property and
Director of the United States Patent and Trademark Office*